(12) United States Patent
Kanno et al.

(10) Patent No.: US 12,124,735 B2
(45) Date of Patent: Oct. 22, 2024

(54) SYSTEM AND METHOD OF WRITING TO NONVOLATILE MEMORY USING WRITE BUFFERS

(71) Applicant: KIOXIA CORPORATION, Tokyo (JP)

(72) Inventors: Shinichi Kanno, Ota (JP); Hideki Yoshida, Yokohama (JP); Naoki Esaka, Kawasaki (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/333,962

(22) Filed: Jun. 13, 2023

(65) Prior Publication Data
US 2023/0325112 A1    Oct. 12, 2023

Related U.S. Application Data

(63) Continuation of application No. 17/523,415, filed on Nov. 10, 2021, now Pat. No. 11,726,707, which is a (Continued)

(30) Foreign Application Priority Data

Jan. 31, 2018   (JP) ................................. 2018-014794

(51) Int. Cl.
G06F 3/06        (2006.01)
G06F 12/0804     (2016.01)

(52) U.S. Cl.
CPC .......... *G06F 3/0656* (2013.01); *G06F 3/0604* (2013.01); *G06F 3/0679* (2013.01); *G06F 12/0804* (2013.01)

(58) Field of Classification Search
CPC .... G06F 3/0656; G06F 3/0604; G06F 3/0679; G06F 12/0804
(Continued)

(56) References Cited

U.S. PATENT DOCUMENTS 10,613,796 B2   4/2020   Kanno
11,237,756 B2   2/2022   Kanno
(Continued)

FOREIGN PATENT DOCUMENTS

TW         201624488 A      7/2016

OTHER PUBLICATIONS

Zhang, Y., et al. "De-indirection for Flash-based SSDs with Nameless Writes", 10th USENIX Conference on File and Storage Technologies (FAST '12), https://www.usenix.org/system/files/conference/fast12/zhang.pdf, 2012, 16 pages.

*Primary Examiner* — Than Nguyen
(74) *Attorney, Agent, or Firm* — Oblon, McClelland, Maier & Neustadt, L.L.P.

(57) ABSTRACT

According to one embodiment, a memory system receives from a host a first write request including a first block identifier designating a first write destination block to which first write data is to be written. The memory system acquires the first write data from a write buffer temporarily holding write data corresponding to each of the write requests, and writes the first write data to a write destination page in the first write destination block. The memory system releases a region in the write buffer, storing data which is made readable from the first write destination block by writing the first write data to the write destination page. The data made readable is a data of a page in the first write destination block preceding the write destination page.

18 Claims, 17 Drawing Sheets

Related U.S. Application Data continuation of application No. 16/803,106, filed on Feb. 27, 2020, now Pat. No. 11,237,756, which is a continuation of application No. 16/126,054, filed on Sep. 10, 2018, now Pat. No. 10,613,796.

(58) Field of Classification Search
USPC .......................................................... 711/154
See application file for complete search history.

(56) References Cited

U.S. PATENT DOCUMENTS

| | | |
|---|---|---|
| 2014/0040650 A1 | 2/2014 | Hida |
| 2015/0254188 A1 | 9/2015 | Yano |
| 2016/0179625 A1 | 6/2016 | Hong |
| 2016/0306552 A1 | 10/2016 | Liu et al. |
| 2016/0334999 A1 | 11/2016 | Um |
| 2017/0109085 A1 | 4/2017 | Jinzenji |
| 2017/0352376 A1 | 12/2017 | Kashyap et al. |
| 2017/0371584 A1 | 12/2017 | Hsieh et al. |
| 2018/0011660 A1 | 1/2018 | Lesartre |
| 2018/0024779 A1 | 1/2018 | Kojima |
| 2019/0004949 A1 | 1/2019 | Kim |
| 2021/0064542 A1* | 3/2021 | Jang .................... G06F 12/0246 |
| 2022/0050626 A1* | 2/2022 | Oh ........................ G06F 3/0656 |
| 2022/0108751 A1* | 4/2022 | Jeong ................... G06F 3/0629 |
| 2023/0143181 A1* | 5/2023 | Tan ....................... G06F 3/0656 |
| | | 711/103 |

* cited by examiner

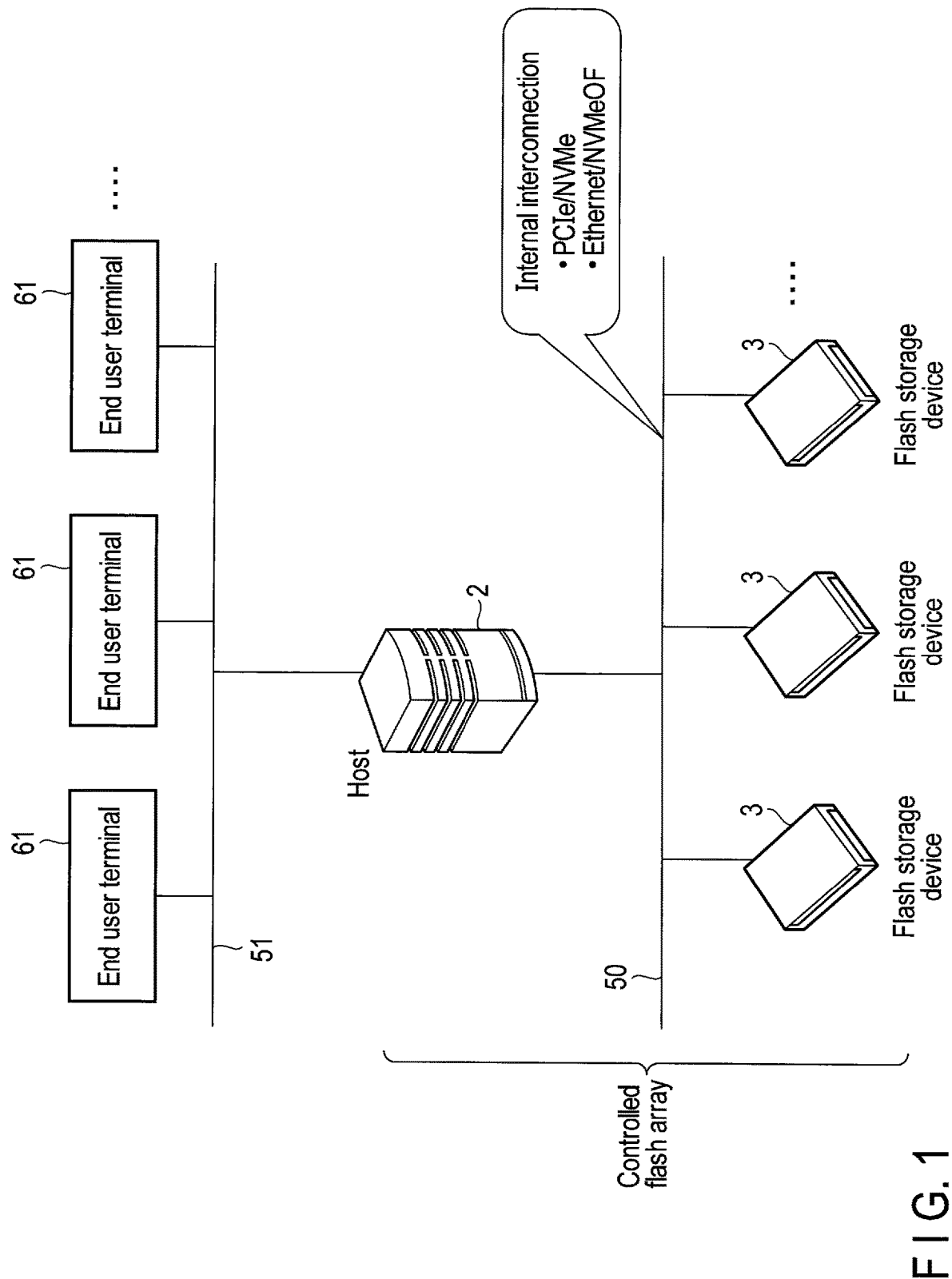
F I G. 1

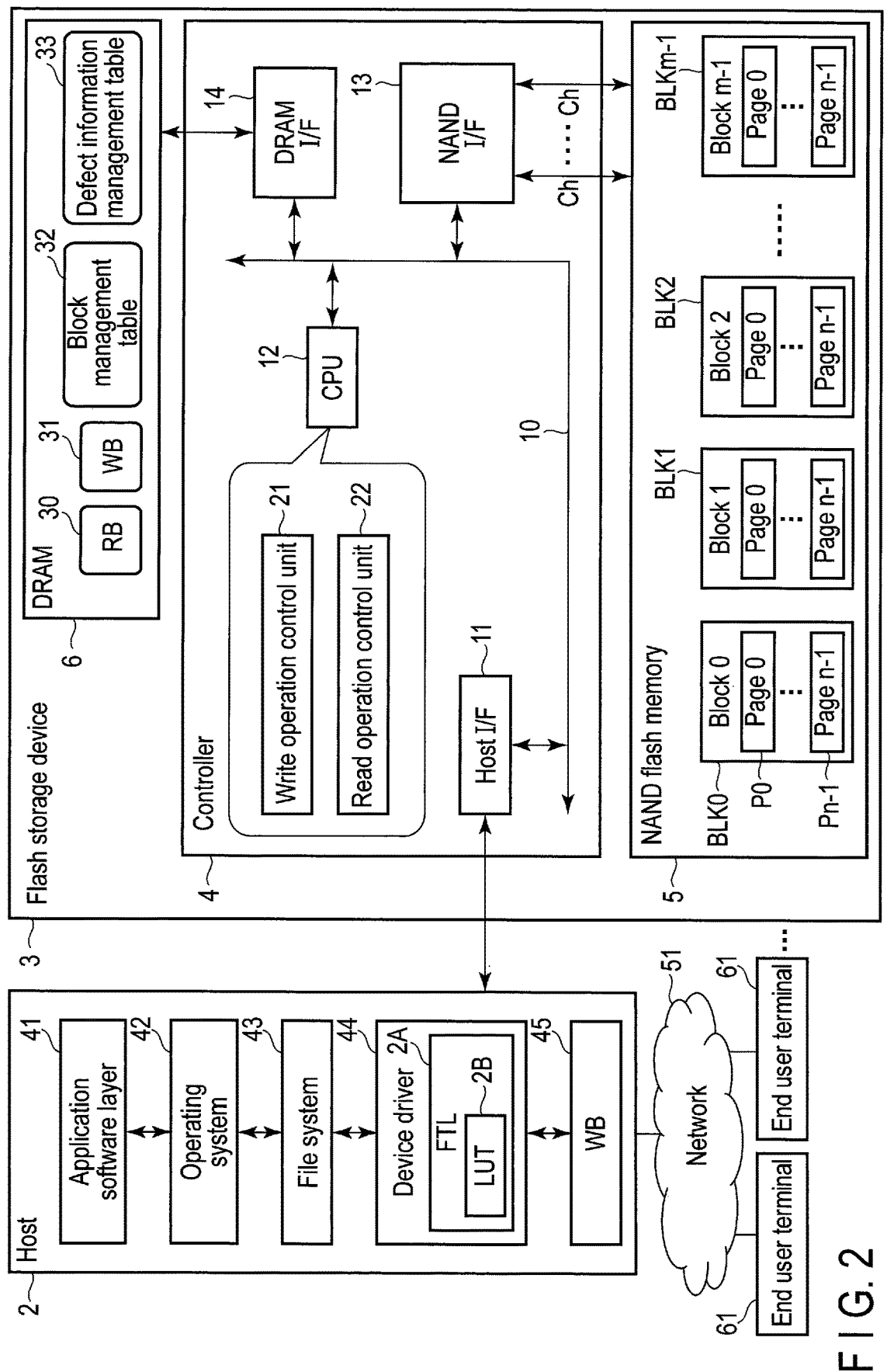
F I G. 2

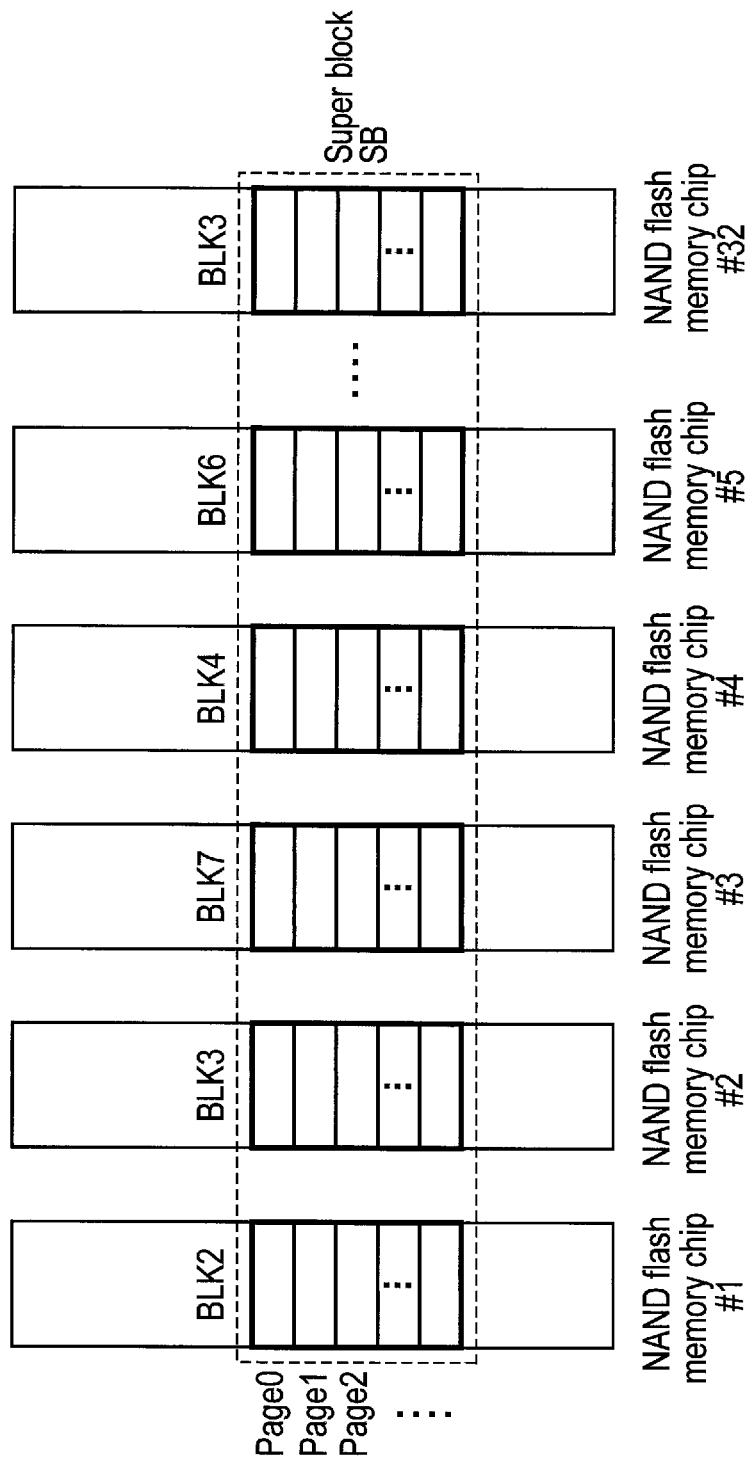
F I G. 4

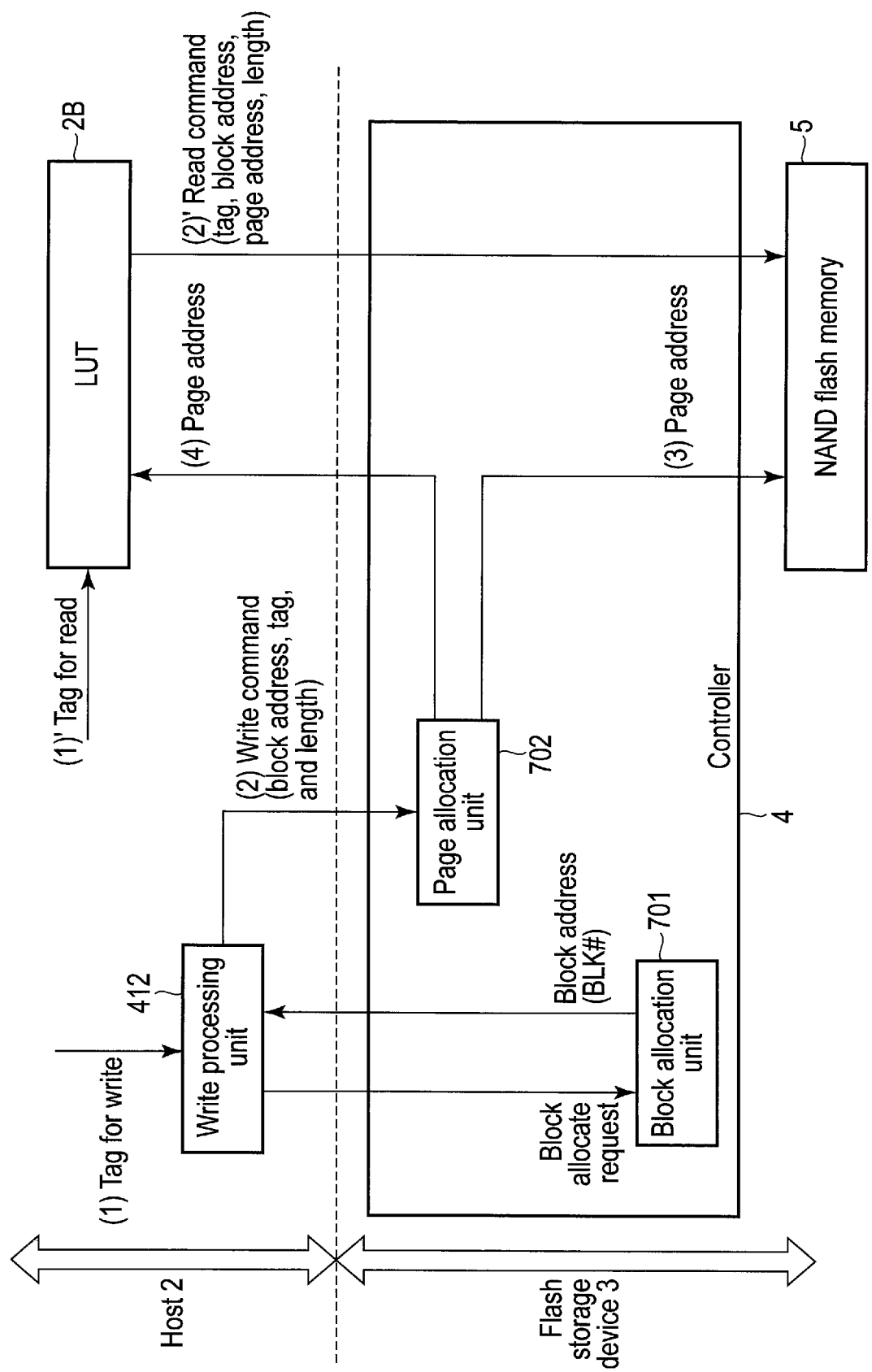
F I G. 6

Block allocate command

|  | Description |
|---|---|
| Command ID | Command ID for block allocate |
|  | Host requires device to allocate free block, and can thereby acquire block address from device |

F I G. 7

Response to Block allocate command

|  | Description |
|---|---|
| Block address | Device selects block to be allocated to host, from free block list, and returns block address of selected block to host |

F I G. 8

Write command

|  | Description |
|---|---|
| Command ID | Command ID for write command |
| Block address | Physical address designating block to which data is to be written |
| Tag | Identifier of data to be written |
| Length | Length of data to be written |

F I G. 9

Response to write command

|  | Description |
|---|---|
| Page address | Physical address designating page to which data is written |
| Length | Length of data written |

F I G. 10

Read command

|  | Description |
|---|---|
| Command ID | Command ID for read command |
| Tag | Identifier of data to be read |
| Block address | Designates block where data to be read is stored |
| Page address | Designates page where data to be read is stored |
| Length | Length of data to be read |

F I G. 11

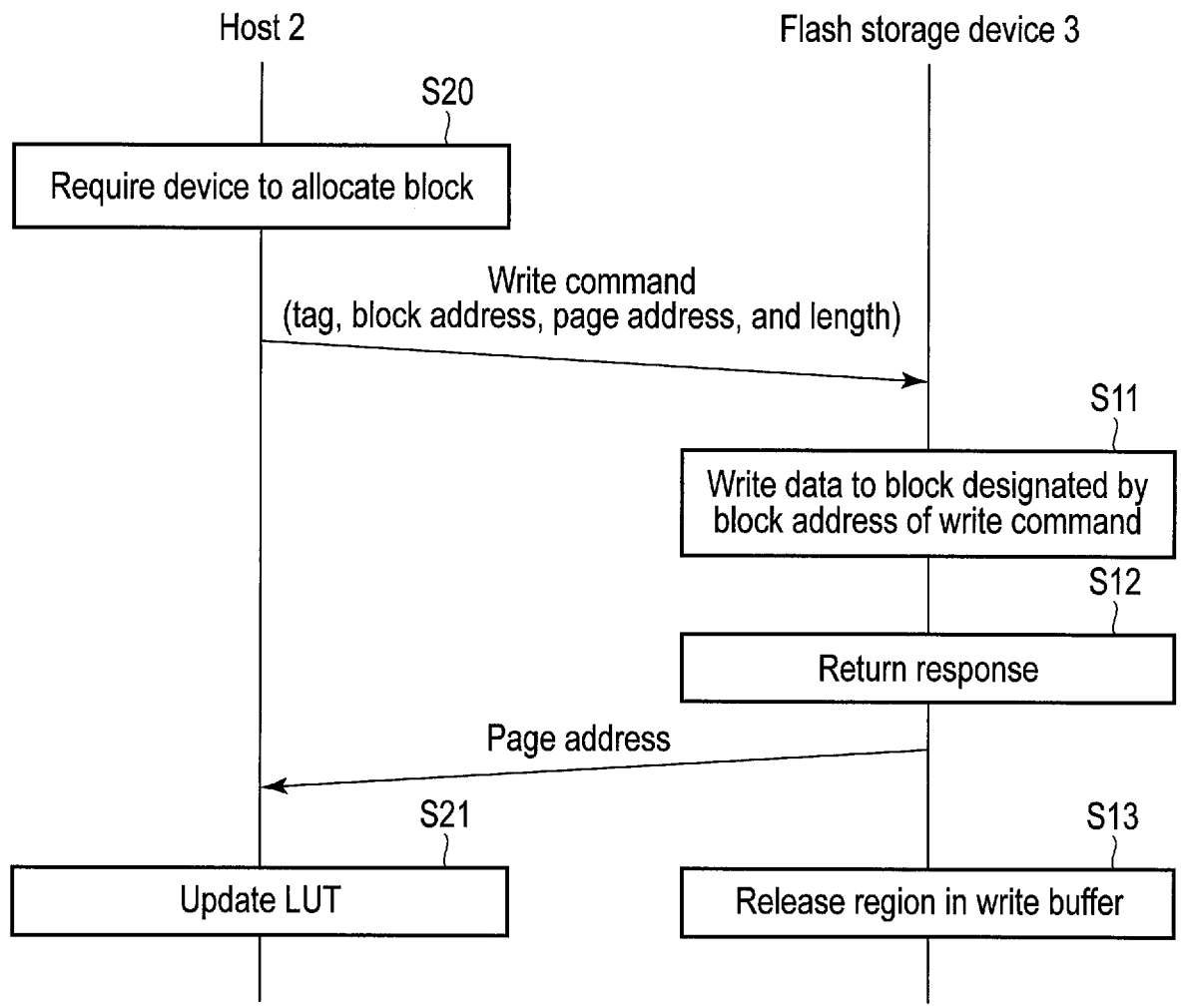
F I G. 12

Write order management table

| Data-written flags | Page No. |
|---|---|
| 1 | P0 |
| 1 | P1 |
| 1 | P2 |
| 0 → 1 | P3 |
| 0 → 1 | P4 |
| 0 → 1 | P5 |
| ⋮ | ⋮ |

Write dummy data → (P3)
Write dummy data → (P4)
Write dummy data → (P5)

F I G. 20

SYSTEM AND METHOD OF WRITING TO NONVOLATILE MEMORY USING WRITE BUFFERS

CROSS-REFERENCE TO RELATED APPLICATIONS

This application is a continuation of and claims benefit under 35 U.S.C. § 120 to U.S. application Ser. No. 17/523,415 filed Nov. 10, 2021, which is a continuation of and claims benefit under 35 U.S.C. § 120 to U.S. application Ser. No. 16/803,106 filed Feb. 27, 2020, which is a continuation of and claims benefit under 35 U.S.C. § 120 to U.S. application Ser. No. 16/126,054 filed Sep. 10, 2018, which is based upon and claims the benefit of priority under 35 U.S.C. § 119 from Japanese Patent Application No. 2018-014794, filed Jan. 31, 2018, the entire contents of each of which are incorporated herein by reference.

FIELD

Embodiments described herein relate generally to a technology of controlling a nonvolatile memory.

BACKGROUND

In recent years, memory systems comprising nonvolatile memories have been widely prevalent. As such a memory system, a solid state drive (SSD) based on a NAND flash technology is known.

SSD is also used as the storage device in a server of the data center.

The storage device used in a host computing system such as a server is required to exert high-level I/O performance.

For this reason, a new interface between a host and a storage device has been recently proposed.

In addition, a current storage device is often required to write different types of data to different write destination blocks.

However, if the number of simultaneously available write destination blocks increases, the data amount necessary to be held in a write buffer increases and a memory resource amount consumed by the write buffer thereby increases. In general, since the memory resource amount which can be used as the write buffer is limited, implement of a technology of reducing the memory resource amount consumed by the write buffer is required.

BRIEF DESCRIPTION OF THE DRAWINGS

FIG. 1 is a block diagram showing a relationship between a host and a memory system (flash storage device) according to an embodiment.

FIG. 2 is a block diagram showing a configuration example of the memory system according to the embodiment.

FIG. 4 is a diagram showing a configuration example of a certain super block used in the memory system according to the embodiment.

FIG. 6 is a block diagram for explanation of a data write operation of designating a write destination block by the host and determining a write destination page by the memory system of the embodiment, and a data read operation of designating the block address and the page address by the host.

FIG. 7 is a table for explanation of a block allocate command (block allocate request) applied to the memory system according to the embodiment.

FIG. 8 is a table for explanation of a response to the block allocate command.

FIG. 9 is a table for explanation of a write command applied to the memory system according to the embodiment.

FIG. 10 is a table for explanation of a response to the write command.

FIG. 11 is a table for explanation of a read command applied to the memory system according to the embodiment.

FIG. 12 is a sequence chart showing a procedure of write processing executed by the host and the memory system according to the embodiment.

FIG. 20 is a table showing a configuration example of a write order management table managed by the memory system according to the embodiments.

DETAILED DESCRIPTION

Figure 3:
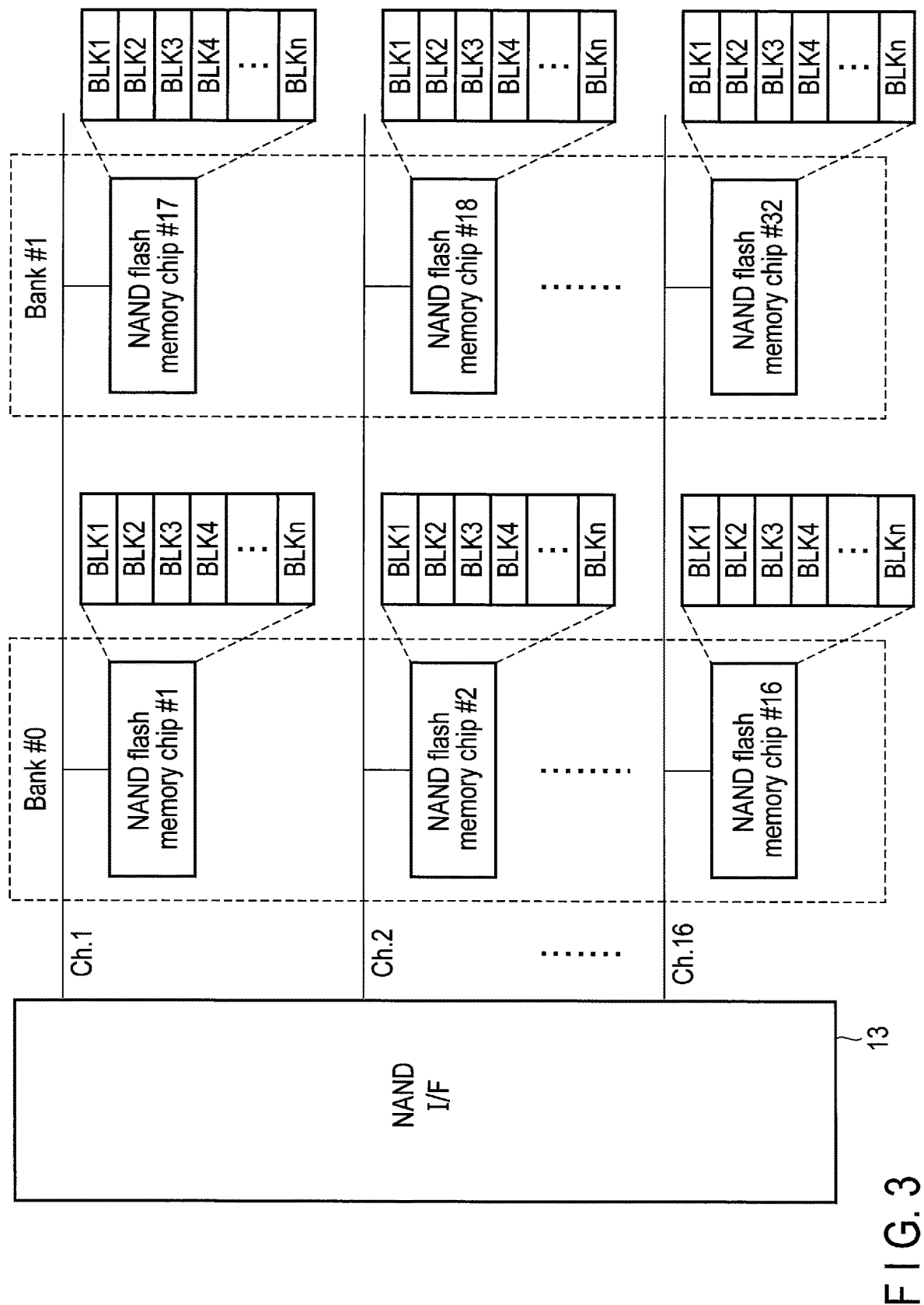
FIG. 3 is a block diagram showing a relationship between plural NAND flash memory chips and plural channels as used in the memory system according to the embodiment.

Various embodiments will be described hereinafter with reference to the accompanying drawings.

In general, according to one embodiment, a memory system connectable to a host, comprises a nonvolatile memory including a plurality of blocks, and a controller. The controller is electrically connected to the nonvolatile memory, and is configured to manage a plurality of write destination blocks allocated from the plurality of blocks, and write data in an order from a leading page to a last page for each of the write destination blocks.

Data written to one page of one of the write destination blocks becomes readable after data is written to one or more subsequent pages of the write destination block. Each of write requests received from the host includes a block identifier designating a write destination block to which write data is to be written.

The controller receives from the host a first write request including a first block identifier designating a first write destination block to which first write data is to be written. The controller acquires the first write data from a write buffer temporarily holding write data corresponding to each of the write requests. The controller writes the first write data to a write destination page in the first write destination block. The controller notifies the host of a page address of the write destination page to which the first write data has been written. The controller increases a page address in the first write destination block to which data is to be next written, by one page. The controller releases a region in the write buffer, storing data which is made readable from the first write destination block by writing the first write data to the write destination page, the data made readable being data of a page in the first write destination block preceding the write destination page.

First, a relationship between a host and a memory system according to an embodiment will be described with reference to FIG. 1.

The memory system is a semiconductor storage device configured to write data to a nonvolatile memory and to read data from the nonvolatile memory. The memory system is implemented as a flash storage device 3 based on the NAND flash technology.

The host (host device) 2 is configured to control plural flash storage devices 3. The host 2 is implemented by an information processing apparatus configured to use a flash array composed of the plural flash storage devices 3 as a storage. This information processing apparatus may be a personal computer or a server computer.

The flash storage device 3 may be utilized as one of plural flash storage devices provided in a storage array. The storage array may be connected to the information processing apparatus such as a server computer via a cable or a network. The storage array comprises a controller which controls plural storages (for example, plural flash storage devices 3) in the storage array. If the flash storage devices 3 are applied to the storage array, the controller of the storage array may function as the host of the flash storage devices 3.

An example in which the information processing apparatus such as a server computer functions as the host 2 will be explained below.

The host (server) 2 and the flash storage devices 3 are interconnected via an interface 50 (internal interconnection). The interface 50 for the interconnection is not limited to this, but PCI Express (PCIe) (registered trademark), NVM Express (NVMe) (registered trademark), Ethernet (registered trademark), NVMe over Fabrics (NVMeOF), and the like can be used as the interface.

A typical example of a server computer which functions as the host 2 is a server computer (hereinafter called a server) in a data center.

In a case where the host 2 is implemented by the server in the data center, the host (server) 2 may be connected to plural end user terminals (clients) 61 via a network 51. The host 2 can provide various services to the end user terminals 61.

Examples of services which can be provided by the host (server) 2 are (1) Platform as a Service (PaaS) which provides a system running platform to each client (each end user terminal 61), (2) Infrastructure as a Service (IaaS) which provides an infrastructure such as a virtual server to each client (each end user terminal 61), and the like.

Plural virtual machines may be executed on a physical server functioning as the host (server) 2. Each of the virtual machines running on the host (server) 2 can function as a virtual server configured to provide various services to several clients (end user terminals 61) corresponding to the virtual machine.

The host (server) 2 comprises a storage management function of managing plural flash storage devices 3 constituting a flash array, and a front-end function of providing various services including the storage access to the end user terminals 61.

The flash storage device 3 comprises a nonvolatile memory such as a NAND flash memory. The flash storage device 3 manages plural write destination blocks allocated by plural blocks in the nonvolatile memory. The write destination block means a block to which data is to be written. A write request (write command) transmitted from the host 2 to the flash storage device 3 includes a block identifier to designate one write destination block to which data is to be written. The flash storage device 3 writes data (write data) received from the host 2 to the write destination block having the block identifier included in the write request. The host 2 can therefore designate a specific write destination block to which the data is to be written. For example, the host 2 may require the storage device 3 to write data from a certain end user terminal 61 (client) to one or more specific write destination blocks corresponding to the end user terminal 61 or may request the storage device 3 to write data from the other end user terminal 61 (client) to one or more other specific write destination blocks corresponding to the other end user terminal 61.

A block identifier included in the write request transmitted from the host 2 may be represented by a block address (block number) which designates the specific write destination block. Alternatively, in a case where the flash storage device 3 comprises plural NAND flash memory chips, the block identifier may be represented by a set of the block address (block number) and the chip number.

The plural write destination blocks managed by the flash storage device 3 can be used by plural end users (clients) sharing the flash storage device 3, respectively. In this case, the same number of write destination blocks as the number of end users which share the flash storage device 3 or more write destination blocks than the end users are opened in the flash storage device 3.

However, if the number of simultaneously available write destination blocks increases, the data amount necessary to be held in a write buffer increases and a memory resource amount consumed by the write buffer thereby increases.

Thus, in the present embodiment, the flash storage device 3 executes an operation of reducing the memory resource amount consumed by the write buffer. In the present embodiment, a predetermined memory region on a memory included in the host 2 may be used as the write buffer or a predetermined memory region on a random-access memory included in the flash storage device 3 may be used as the write buffer.

FIG. 2 shows a configuration example of the flash storage device 3.

The flash storage device 3 comprises a controller 4 and a nonvolatile memory (NAND flash memory) 5. The flash storage device 3 may comprise a random access memory, for example, a DRAM 6.

The NAND flash memory 5 comprises a memory cell array comprising a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes plural blocks BLK0 to BLKm-1. Each of the blocks BLK0 to BLKm-1 includes plural pages (pages P0 to Pn-1 in this case). The blocks BLK0 to BLKm-1 function as erase units. The blocks may be referred to as "erase blocks", "physical blocks" or "physical erase blocks". The pages P0 to Pn-1 are units for a data write operation and a data read operation.

The controller 4 is electrically connected to the NAND flash memory 5 which is a nonvolatile memory, via a NAND interface 13 such as toggle or open NAND flash interface (ONFI). The controller 4 operates as a memory controller configured to control the NAND flash memory 5. The controller 4 may be implemented by a circuit such as a system-on-a-chip (SoC).

The NAND flash memory 5 may include a plurality of NAND flash memory chips (NAND flash memory dies) as shown in FIG. 3. Each of the NAND flash memory chips can operate independently. For this reason, the NAND flash memory chips function as parallel operation units. FIG. 3 shows a case where sixteen channels Ch.1 to Ch.16 are connected to the NAND interface 13, and two NAND flash memory chips are connected to each of sixteen channels Ch.1 to Ch.16. In this case, sixteen NAND flash memory chips #1 to #16 connected to channels Ch.1 to Ch.16 may be formed as bank #0, and remaining sixteen NAND flash memory chips #17 to #32 connected to channels Ch.1 to Ch.16 may be formed as bank #1. The banks function as units for operating a plurality of memory modules in parallel by bank interleaving. In the configuration example shown in FIG. 3, a maximum of thirty-two NAND flash memory chips can be operated in parallel by sixteen channels, and the bank interleaving using two banks.

An erase operation may be executed in units of the blocks (physical blocks) or in units of parallel access unit (super blocks) each including a set of plural physical blocks capable of parallel operation. One parallel access unit, i.e., one super block including a set of plural physical blocks are not limited to these, but may include a total of thirty-two blocks each selected from NAND flash memory chips #1 to #32. Each of NAND flash memory chips #1 to #32 may have a multi-plane configuration. For example, if NAND flash memory chips #1 to #32 have such a multi-plane configuration including two planes, one super block may include a total of sixty-four physical blocks each selected from sixty-four planes corresponding to NAND flash memory chips #1 to #32.

FIG. 4 shows an example of a super block (SB) including thirty-two physical blocks (physical block BLK2 in NAND flash memory chip #1, physical block BLK3 in NAND flash memory chip #2, physical block BLK7 in NAND flash memory chip #3, physical block BLK4 in NAND flash memory chip #4, physical block BLK6 in NAND flash memory chip #5, . . . , physical block BLK3 in NAND flash memory chip #32).

The write destination block may be one physical block or one super block. A configuration that one super block includes only one physical block may be used and, in this case, one super block is equivalent to one physical block.

Next, the configuration of the controller 4 shown in FIG. 2 will be explained.

The controller 4 comprises a host interface 11, a CPU 12, the NAND interface 13, a DRAM interface 14, and the like. The host interface 11, the CPU 12, the NAND interface 13, and the DRAM interface 14 are interconnected via a bus 10.

The host interface 11 is a host interface circuit configured to execute communications with the host 2. The host interface 11 may be, for example, a PCIe controller (NVMe controller). Alternatively, the host interface 11 may be an NVMe over Fabrics (NVMeOF) controller, in a configuration that the flash storage device 3 is connected to the host 2 via Ethernet (registered trademark). In the configuration that the flash storage device 3 is connected to the host 2 via Ethernet (registered trademark), the number of flash storage device 3 can be increased easily. Furthermore, the number of hosts 2 can also be increased easily.

The host interface 11 receives various requests (commands) from the host 2. The requests (commands) include a write request (write command), a read request (read command), and the other various requests (commands).

The CPU 12 is a processor configured to control the host interface 11, the NAND interface 13, and the DRAM interface 14. The CPU 12 loads a control program (firmware) from the NAND flash memory 5 or a ROM (not shown) to the DRAM 6 in response to power-on of the flash storage device 3 and executes various processing by executing the firmware. The firmware may be loaded into a SRAM (not shown) in the controller 4. The CPU 12 can execute command processing for processing various commands from the host 2, and the like. Operations of the CPU 12 can be controlled by the above-described firmware executed by the CPU 12. A part of or all parts of the command processing may be executed by dedicated hardware in the controller 4.

The CPU 12 can function as a write operation control unit 21 and a read operation control unit 22.

The write operation control unit 21 manages plural write destination blocks allocated from plural blocks of the NAND flash memory 5, and writes data to each of the write destination blocks in the order from a leading page to a last page.

In many NAND flash memories, data written to one page of one write destination block cannot be read from the write destination block immediately after the write, but becomes readable after data is written to one or more subsequent pages of the write destination block.

In a case of writing the data to each of the pages of the write destination block by a program operation of plural steps including a first step and a second step, for example, data written to a certain page (first page) in the write destination block by the first-step program operation becomes readable after data is written to one or more subsequent pages by the first-step program operation. This is because the second-step program operation on the first page cannot be executed until the data is written to one or more subsequent pages by the first-step program operation. For this reason, even if data is written to the first page of the write destination block by the first-step program operation, the data cannot be read from the write destination block immediately after the write, but becomes readable after data is written to one or more subsequent pages by the of the first-step program operation.

One of examples of the program operation of plural steps is foggy-fine program operation. In the foggy-fine program operation, writing data to memory cell groups connected to the same word line is executed by foggy program operation of roughly setting a threshold distribution of each of memory cells and fine program operation of adjusting the threshold distribution or each of memory cells. To reduce program disturb between adjacent word lines, the fine program operation for a memory cell group connected to a certain word line is executed after the foggy program operation for the memory cell group connected to the adjacent word lines is executed.

For this reason, in a case of writing the data by the foggy-fine program operation, even if the foggy program operation for the memory cell group connected to the first word line (WL0) in the write destination block is executed, the fine program operation for the memory cell group connected to the first word line (WL0) cannot be executed until the foggy program operation for the memory cell group connected to the next word line (WL1) in the write destination block is finished. Therefore, the page data written to the memory cell group connected to the first word line (WL0) cannot be read until at least the foggy program operation for the memory cell group connected to the next word line (WL1) is finished.

The write operation control unit 21 receives from the host 2 the write request including the block identifier designating a write destination block to which the write data is to be written. When the write operation control unit 21 receives the write request from the host 2, the write operation control unit 21 acquires the write data corresponding to the write request from the write buffer (WB). The write buffer (WB) is a buffer which temporarily holds the write data corresponding to each write request. Write data corresponding to a certain write request is held in the write buffer (WB) until the write data becomes readable from the NAND flash memory 5. The write buffer (WB) may be implemented by a write buffer (WB) 45 provided on the memory of the host 2 or a write buffer (WB) 31 on the DRAM 6.

The write operation control unit 21 writes the acquired write data to a page (write destination page) in the write destination block having the block identifier designated by the received write request. The write request includes the block identifier (block address), but does not include the page address. The write destination page is automatically determined by the write operation control unit 21. The write operation control unit 21 notifies the host 2 of the page address of the page to which the write data has been written.

The write operation control unit 21 increases the page address in the write destination block to which the data is to be next written, by one page. Then, the write operation control unit 21 releases a region in the write buffer, storing the data which is made readable from the write destination block by writing the write data to the write destination page. The data made readable is data of the page in the write destination block preceding the write destination page. The page preceding the write destination page is indicative of the page where the data is written prior to being written to the write destination page with respect to the order of writing to the pages of the write destination block. For example, if the first page in the write destination block preceding n-th page is made readable by writing the data to the n-th page of the write destination block, the region in the write buffer, storing the data of the first page, is released. Similarly, if, for example, the second page in the write destination block is made readable by writing the data to the n+1-th page of the write destination block, the region in the write buffer, storing the data of the second page, is released. In a case where writing of data to each page is executed by the program operation of plural stages including a first step and a second step, the page which is made readable from the write destination block by writing the data to the write destination page: of the write destination block is the page on which the second-step program operation is made executable by executing the first-step program operation on the write destination page. For example, if the second-step program operation (for example, fine program operation) on the first page of the write destination block is made executable by the first-step program operation (for example, foggy program operation) on the n-th page of the write destination block, the page which is made readable from the write destination block by writing the data to the write destination page is this first page.

Thus, by releasing the region in the write buffer, storing data which is made readable by writing data to a certain write destination page in the write destination block, the amount of the write buffer consumed per write destination block can be suppressed to a minimum and reduction in the memory resource amount consumed by the write buffer can be thereby attempted.

Writing write data (user data) for one page to the write destination block is assumed here but, if new write data (user data) for two-pages is written to the write destination block, two-page data (user data) previously written to this write destination block is made readable. Therefore, in this case, the region in the write buffer where the two-page data (user data) made readable is stored, can be released.

Similarly, if new write data (user data) for three-pages is written to the write destination block, three-page data (user data) previously written to this write destination block is made readable. Therefore, in this case, the region in the write buffer where three-page data (user data) made readable is stored, can be released.

Furthermore, the write operation control unit 21 also executes an operation of writing dummy data for one or more pages to the write destination block as needed, in order to increase the available region in the write buffer.

For example, if the write buffer includes no unused regions, the write operation control unit 21 may write the dummy data to one or more pages in a certain write destination block. Thus, the data (user data) for one or more pages previously written to the write destination block is made readable, and the region in the write buffer where the data (user data) for one or more pages made readable is stored, can be released. This released region in the write buffer can be therefore used to store next write data (user data). Since the read request to the dummy data is not issued by the host 2, the dummy data does not need to be stored in the write buffer. Therefore, even if the dummy data is written to the write destination block, the write buffer is not consumed by the dummy data.

In addition, if the write operation control unit 21 detects that writing of data (user data or dummy, data) for predetermined number or pages per predetermined period to any one of plural write destination blocks is not executed, the write operation control unit 21 may write dummy data to one or more pages in this write destination block. In this case, for example, the write operation control unit 21 may determine whether a time elapsed after the data (user data or dummy data) is last written to the certain write destination block is more than or equal to a threshold value or not and, if the elapsed time is more than or equal to the threshold value, the write operation control unit 21 may write the dummy data to one or more pages in this write destination block. As a result, the data (user data) for one or more pages previously written to the write destination block is made readable, and the region in the write buffer where the data (user data) for one or more pages made readable is stored, can be released. Similarly, as regards each of the other write destination blocks, too, the write operation control unit 21 may determine whether a time elapsed after the data (user data or dummy data) is last written to this write destination block is more than or equal to the threshold value or not and, if the elapsed time is more than or equal to the threshold value, the write operation control unit 21 may write the dummy data to one or more pages in this write destination block.

The read operation control unit 22 receives from the host 2 the read request (read command) designating the physical address (block address and page address) indicative of the physical storage location in the NAND flash memory 5 where the data to be read is stored. The read operation control unit 22 reads the data from the physical storage location to be read in the block to be read, based on the block address and the page address. The block to be read is specified by the block address. The physical storage location to be read in the block is specified by the page address. The read command may include an in-page offset in addition to the block address and the page address.

The NAND interface 13 is a memory control circuit configured to control the NAND flash memory 5 under control of the CPU 12.

The DRAM interface 14 is a DRAM control circuit configured to control the DRAM 6 under control of the CPU 12. A part of a storage region of the DRAM 6 may be used to store a read buffer (RB) 30, a write buffer (WB) 31, the block management table 32, and the defect information management table 33. The read buffer (RB) 30, the write buffer (WB) 31, the in-block LUT 32, and the block management table 32 may be stored in SRAM (not shown) in the controller 4. The block management table 32 includes plural management tables corresponding to plural blocks in the NAND flash memory 5, respectively. Each of the management tables includes plural validity/invalidity management information corresponding to plural data units included in the block corresponding to the management table. Each of the validity/invalidity management information is indicative of whether the data unit corresponding to this validity/invalidity management information is the valid data or the invalid data. The defect information management table 33 manages a list of defective blocks. As explained above, the host 2 may be an information processing apparatus (for example, computing system) configured to execute various programs. The programs executed by the computing system include an application software layer 41, an operating system 42, a file system 43, a device driver 43, and the like.

As is generally known, the operating system 42 is software configured to manage the entire host 2, control the hardware in the host 2, and execute the control to enable an application to use the hardware and the flash storage device 3.

The file system 43 is used to control the file operation (creation, saving, updating, deletion, and the like).

Various application software threads run on the application software layer 41. Examples of the application software threads are client software, database software, virtual machine, and the like.

The device driver 44 controls the flash storage device 3 under control of the file system 43.

The file system 43 or the device driver 44 may comprise a flash translation layer (FTL) 2A for managing a lookup table (LUT) 45 which functions as the address translation table. FIG. 2 shows a case where the device driver 44 includes the flash translation layer (FTL) 2A. The lookup table (LUT) 45 manages mapping between each of tags for identifying individual data and each of physical addresses indicative of individual physical storage locations in the flash storage device 3 (i.e., NAND flash memory 5). The tag may be represented by a logical address such as a logical block address (LBA), may be represented by a key of a key-value store, or may be represented by a set of the file name and the file offset.

A predetermined memory region on the memory in the host 2 may be used as a write buffer (WB) 45 (unified write buffer: UWB). When the host 2 wishes to write data to any one of the plural write destination blocks, the host 2 stores, to the write buffer (WB) 45, data (write data) to be written to the write destination block. Then, the host 2 transmits the write request including the block identifier (block address) designating the write destination block to the flash storage device 3. This write request may further include memory location information indicative of a region (storage region) in the write buffer (WB) 45 in which the write data is stored.

When writing the write data to the NAND flash memory 5, the flash storage device 3 can acquire the write data from the write buffer (WB) 46 by transmitting a transfer request including the above-explained memory location information to the host 2.

Figure 5:
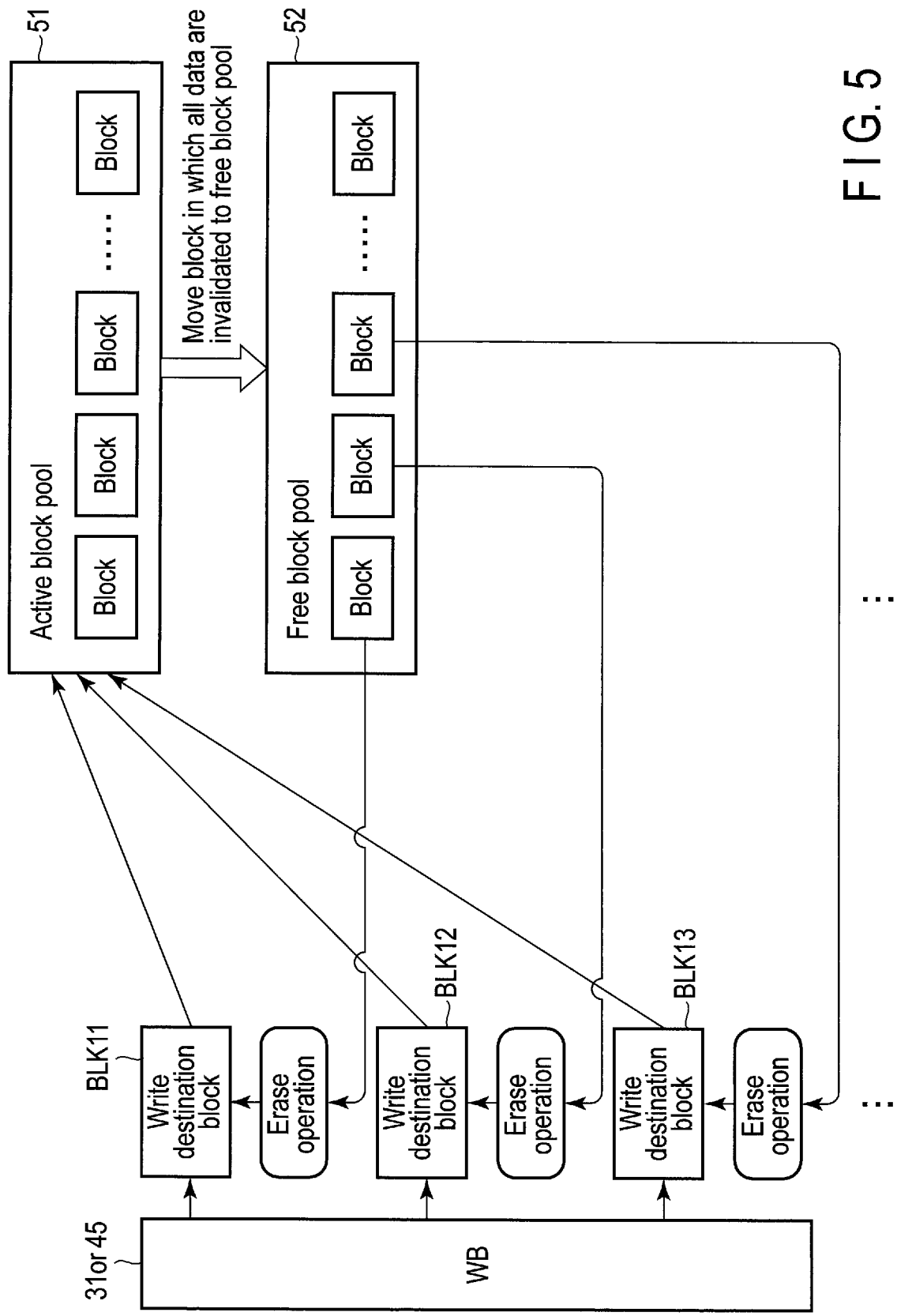
FIG. 5 is a block diagram showing a relationship among an active block pool, a free block pool, and plural write destination blocks, the active block pool, the free block pool, and the write destination blocks being managed by the memory system according to the embodiment.

FIG. 5 shows a relationship among an active block pool, a free block pool, and plural write destination blocks, which are managed by the flash storage device 3.

The states of the respective blocks in the NAND flash memory 5 are largely classified into an active block which stores valid data and a free block which does not store valid data. Each of blocks which are active blocks is managed by a list referred to as an active block pool 51. On the other hand, each of blocks which are free blocks is managed by a list referred to as a free block pool 52.

The valid data means data associated with a certain tag (latest data associated with the tag). The invalid data means data which is not associated with any tags.

When the controller 4 of the flash storage device 3 receives a block allocate request from the host 2, the controller 4 selects one free block from plural free blocks in the free block pool 52 and allocates the selected free block as a write destination block to which write data received from the host 2 can be written. Every time the controller 4 receives the block allocate request from the host 2, the controller 4 executes the operation of selecting one free block from the plural free blocks in the free block pool 52 and the operation of allocating the selected free block as the write destination block. In the flash storage device 3, plural available write destination blocks are thereby present simultaneously. In FIG. 5, it is assumed that blocks BLK11, BLK12, BLK13, . . . are allocated as the write destination blocks.

In the processing of allocating the write destination blocks, the controller 4 first executes an erase operation on one block (free block) selected from the plural free blocks in the free block pool 52, and thereby sets this block to be in a writable erase state. The host 2 is notified of a block identifier (block address) of each of the allocated write destination blocks by the controller 4. The host 2 can write the data to an arbitrary write destination block of write destination blocks BLK11, BLK12, BLK13, . . . by selecting one of the plural write destination blocks BLK11, BLK12, BLK13, . . . currently allocated, and transmitting the write request including the block identifier (block address) designating the selected write destination block to the flash storage device 3.

When an entire certain write destination block is filled with the write data (user data) from the host 2, the controller 4 moves the write destination block to the active block pool 51.

If all valid data in the certain block in the active block pool 51 is invalidated by data update, unmapping, garbage collection, and the like, the controller 4 moves this block to the free block pool 52.

FIG. 6 is a diagram for explanation of a data write operation of designating the write destination block by the host 2 and determining the write destination page by the flash storage device 3, and a data read operation of designating the block address and the page address by the host 2.

The host 2 comprises a write processing unit 412 configured to transmit the block allocate request and the write request to the flash storage device 3. The write processing unit 412 may be included in the FTL 2A explained with reference to FIG. 2.

The controller 4 of the flash storage device 3 comprises a block allocation unit 701 and a page allocation unit 702. The block allocation unit 701 and the page allocation unit 702 may be included in the write operation control unit 21 explained with reference to FIG. 2.

The data write operation is executed in the following procedure.

(1) When the write processing unit 412 of the host 2 needs to write the data (write data) to the flash storage device 3, the write processing unit 412 may request the flash storage device 3 to allocate a free block. The controller 4 of the flash storage device 3 comprises the block allocation unit 701 which manages free blocks of the NAND flash memory 5. When the block allocation unit 701 receives this request (block allocate request) from the write processing unit 412, the block allocation unit 701 allocates one free block of the free blocks to the host 2 and notifies the host 2 of a block address (BLK #) of the allocated block.

(2) The write processing unit 412 transmits to the flash storage device 3 a write request (write command) which includes both of a tag (for example, logical address such as LBA) for identifying write data and a block address (BLK #) for designating a specific write destination block.

(3) The controller 4 of the flash storage device 3 comprises the page allocation unit 702 which allocates a page for data write. When the page allocation unit 702 receives the write request, the page allocation unit 702 determines a page address indicative of the write destination page in the block (write destination block) having the block address designated by the write request. The controller 4 writes the write data received from the host 2 to the determined write destination page in the write destination block.

(4) The controller 4 notifies the host 2 of the page address indicative of the write destination page as a response to the write request. Alternatively, the controller 4 may notify the host 2 of a set of the tag included in the write request, the block address included in the write request, and the determined page address as a response to the write request. In the host 2, the LUT 2B is updated such that the physical address (block address and page address) indicative of the physical storage location to which the write data is written is mapped to the tag of the write data.

The data read operation is executed in the following procedure.

(1)' When the host 2 needs to read data from the flash storage device 3, the host 2 acquires the physical address (block address and page address) corresponding to the tag of the data to be read, from LUT 2B, by referring to LUT 2B.

(2)' The host 2 transmits the read request designating the acquired block address and the acquired page address to the flash storage device 3. When the controller 4 of the flash storage device 3 receives the read request from the host 2, the controller 4 reads the data from the physical storage location to be read in the block to be read, based on the block address and the page address.

FIG. 7 shows a block allocate command applied to the flash storage device 3.

The block allocate command is a command (block allocate request) to require the flash storage device 3 to allocate the write destination block (free block). The host 2 can require the flash storage device 3 to allocate the write destination block and thereby acquire the block address (i.e., the block address of the allocated write destination block), by transmitting the block allocate command to the flash storage device 3.

FIG. 8 shows a response to the block allocate command.

When the flash storage device 3 receives the block allocate command from the host 2, the flash storage device 3 selects the free block which should be allocated to the host 2, from the free block list, allocates the selected free block as the write destination block, and returns the response including the block address of this write destination block to the host 2.

FIG. 9 shows a write command applied to the flash storage device 3.

The write command is a command to require the flash storage device 3 to write data. This write command may include the command ID, the block address, the tag, the length, and the like.

The command ID is an ID (command code) indicating that this command is the write command, and the command ID for the write command is included in the write command.

The block address is a physical address designating the write destination block to which the data should be written.

The tag is an identifier for identifying write data which should be written. This tag may be a logical address such as LBA, or a key of a key-value store as explained above. If the tag is the logical address such as LBA, the logical address (starting LBA) included in this write command is indicative of a logical location (first logical location) in the logical address space to which the write data should be written.

The length is indicative of the length of the write data to be written.

When the controller 4 receives the write command from the host 2, the controller 4 determines the write destination location (write destination page) in the write destination block having the block address designated by the write command. The write destination page is determined in consideration of the restrictions on page write order, the bad pages, and the like. Then, the controller 4 writes the data from the host 2 to the write destination location (write destination page) in the write destination block.

FIG. 10 shows a response to the write command shown in FIG. 9.

This response includes the page address and the length. The page address is a physical address indicative of the physical storage location in the write destination block to which the data has been written. This physical address may be represented by an in-block offset. (i.e., a set of the page address and the in-page offset). The length is indicative of the length of the written data.

Alternatively, this response may further include not only the page address (in-block offset) and the length, but also the tag and the block address. The tag is the tag included in the write command shown in FIG. 9. The block address is the block address included in the write command shown in FIG. 9.

FIG. 11 shows a read command applied to the flash storage device 3.

The read command is a command to require the flash storage device 3 to read data. This read command includes the command ID, the tag, the block address, the page address, and the length.

The command ID is an ID (command code) indicating that this command is the read command, and the command ID for the read command is included in the read command.

The block address is indicative of a block storing the data which should be read. The page address is indicative of a page storing the data which should be read. This page address may be represented by an in-block offset (i.e., a set of the page address and the in-page offset) indicative of the physical storage location in the block storing the data which should be read. The length is indicative of the length of the data to be read.

FIG. 12 shows a sequence of write processing executed by the host 2 and the flash storage device 3.

The host 2 first requires the flash storage device 3 to allocate the write destination block by transmitting the block allocate command to the flash storage device 3. If the host writes the data to the already allocated write destination block, the host 2 may not transmit the block allocate command to the flash storage device 3.

Then the host 2 transmits to the flash storage device 3 the write command including the tag for identifying the write data, the block address for designating the write destination block to which the write data is to be written, and the length of the write data (step S20).

When the controller 4 of the flash storage device 3 receives this write command, the controller 4 determines the write destination page in the write destination block having the block address designated by the write command, acquires the write data from the write buffer (WB), and writes the write data to the determined write destination page in the write destination block (step S11). If the write buffer (WB) is implemented by the write buffer (WB) 45 provided on the memory included in the host 2, the write command may include memory location information indicative of the location (region) in the write buffer where the write data is stored. The controller 4 can acquire the write data from the write buffer (WB) 45 provided on the memory in the host 2, by transmitting a transfer request including the memory location information to the host 2.

The controller 4 returns a response to the write command to the host 2 (step S12). This response includes at least the page address (for example, a set of the page address and the in-page offset) to which the data is written.

When the host 2 receives this response, the host 2 maps the physical address (i.e., a set of the block address, page address, and in-page offset) indicative of the physical storage location to which the write data is written to the tag of the write data, by updating LUT 2B managed by the host 2 (step S21).

Furthermore, the controller 4 specifies the page in the write destination block preceding the write destination page, which is made readable from the write destination block by writing the write data to the write destination page in the write destination block, and releases (frees) the region in the write buffer (WB) where data of the specified page is stored (step S13). In a case where writing of data to each page of the write destination block is executed by the program operation of plural stages including a first step and a second step, the page made readable is the page where the second-step program operation can be executed by the first-step program operation on the write destination page.

Processing of releasing this region in the write buffer (WB) may be executed when, for example, the data to be written to the specified page is transferred from the write buffer (WB) to the NAND flash memory 5 or may be executed after executing the second-step program operation (for example, fine program operation) on the specified page.

If the write buffer (WB) is implemented by the write buffer (WB) 45 provided on the memory in the host 2, the controller 4 transmits to the host 2 a request to release this region in the write buffer (WB) 45 where the date of the page made readable is stored, in step S13.

Figure 13:
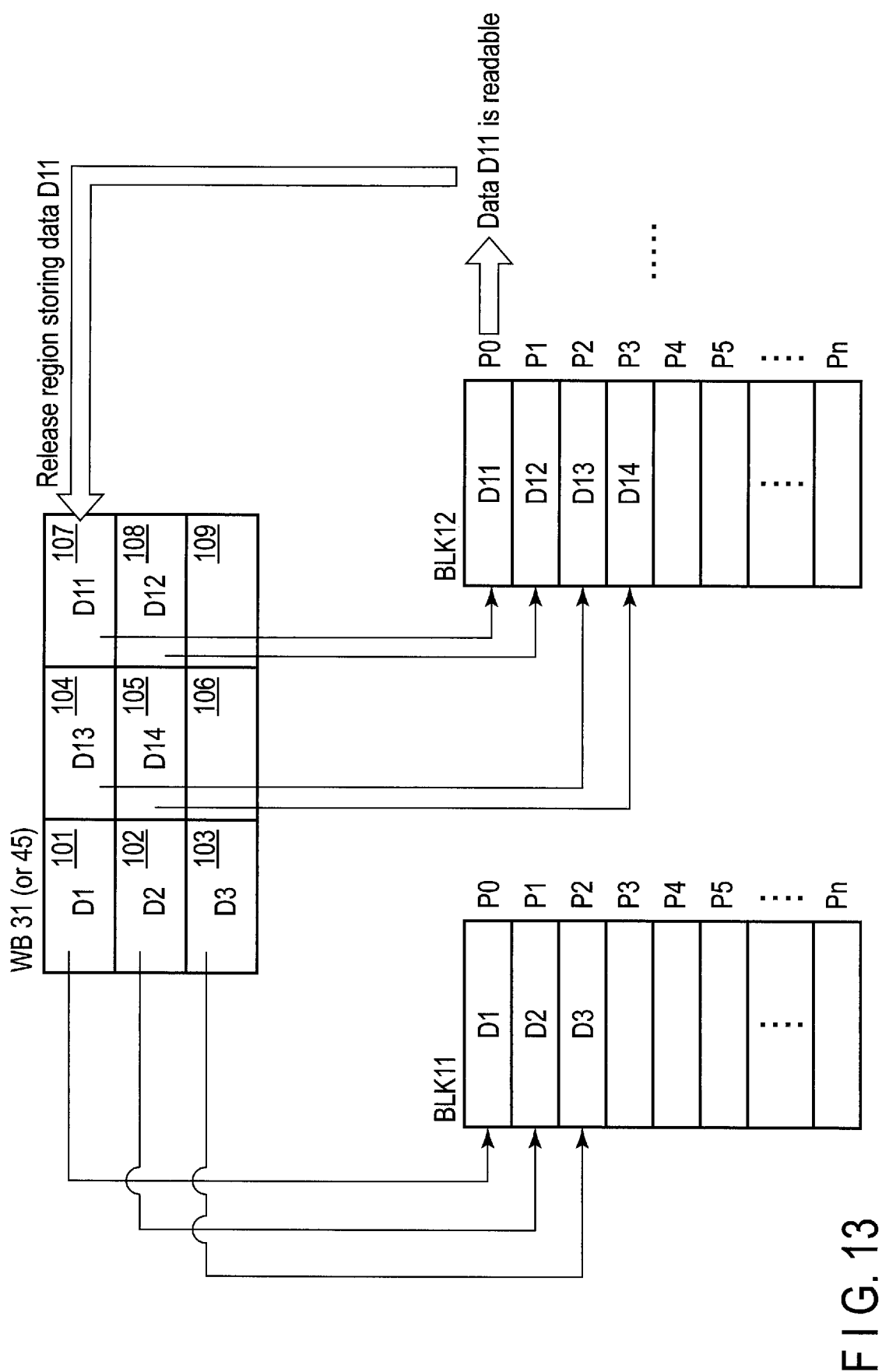
FIG. 13 is a diagram for explanation of an operation of releasing (freeing) a region in a write buffer, storing data which is made readable from a certain write destination block by writing data to the certain write destination block.

FIG. 13 shows an operation of releasing a region in the write buffer, storing data which is made readable from a certain write destination block by writing data to the certain write destination block.

The write data corresponding to each write request is stored in the write buffer (WB) 31 (or 45). The write buffer (WB) 31 (or 45) includes plural regions for storing data of plural pages. In FIG. 13, the write buffer (WB) 31 (or 45) includes regions 101 to 109 to simplify the illustration. Each of the regions 101 to 109 has a one-page size.

If write data D1, D2, and D3 stored in the regions 101 to 103 of the write buffer (WB) are the write data to be written to the write destination block BLK11, write data D1, D2, and D3 are written to, for example, pages P0, P1, and P2 of write destination block BLK11, respectively.

If write data D11, D12, D13, and D14 stored in the regions 107, 108, 104, and 105 of the write buffer (WB) are the write data to be written to the write destination block BLK11, write data D11, D12, D13, and D14 are written to, for example, pages P0, P1, P2, and P3 of write destination block BLK12, respectively.

Even if data is written to leading page P0, in each of the write destination blocks, the data cannot be immediately read from page P0 but the data can be read from page P0 after writing the data to several subsequent pages is executed. Similarly, even if data is written to leading page P1, the data cannot be immediately read from page P1 but the data can be read from page P1 after writing the data to several subsequent pages is executed.

For example, it is assumed here that the data is made readable from page P0 preceding pages P1 to P3 after data is written to pages P1 to P3 subsequent to page P0.

In this case, after the controller 4 writes write data D14 to page P3 of write destination block BLK12, the controller 4 releases the region 107 in the write buffer (WB) storing write data D11 of page P0 in write destination block BLK12 preceding page P3, which is made readable by writing write data D14. The released region 107 is thereby made available to store new write data.

Figure 14:
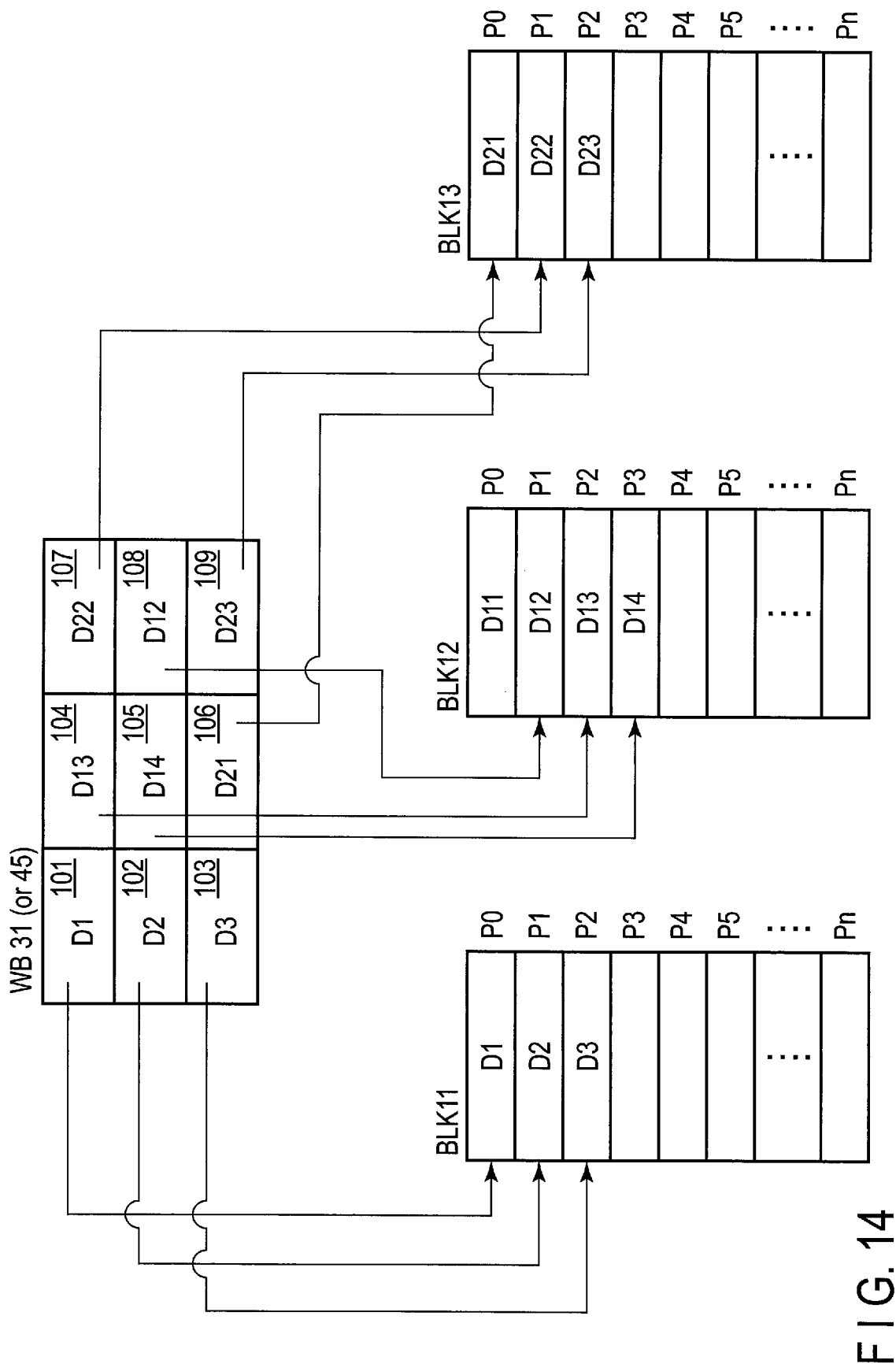
FIG. 14 is a diagram showing a state in which all of plural regions in the write buffer are used to hold the write data.

FIG. 14 shows a state in which all of plural regions in the write buffer (WB) are used to hold the write data.

In FIG. 14, the regions 101 to 109 are used to store write data D1, D2, and D3 written to write destination block BLK11, write data D12, D13, and D14 written to write destination block BLK12, and write data D21, D22, and S23 written to write destination block BLK13.

Thus, the host 2 becomes unable to store new write data to the write buffer (WB) in the state in which the write buffer (WB) includes no unused regions.

Figure 15:
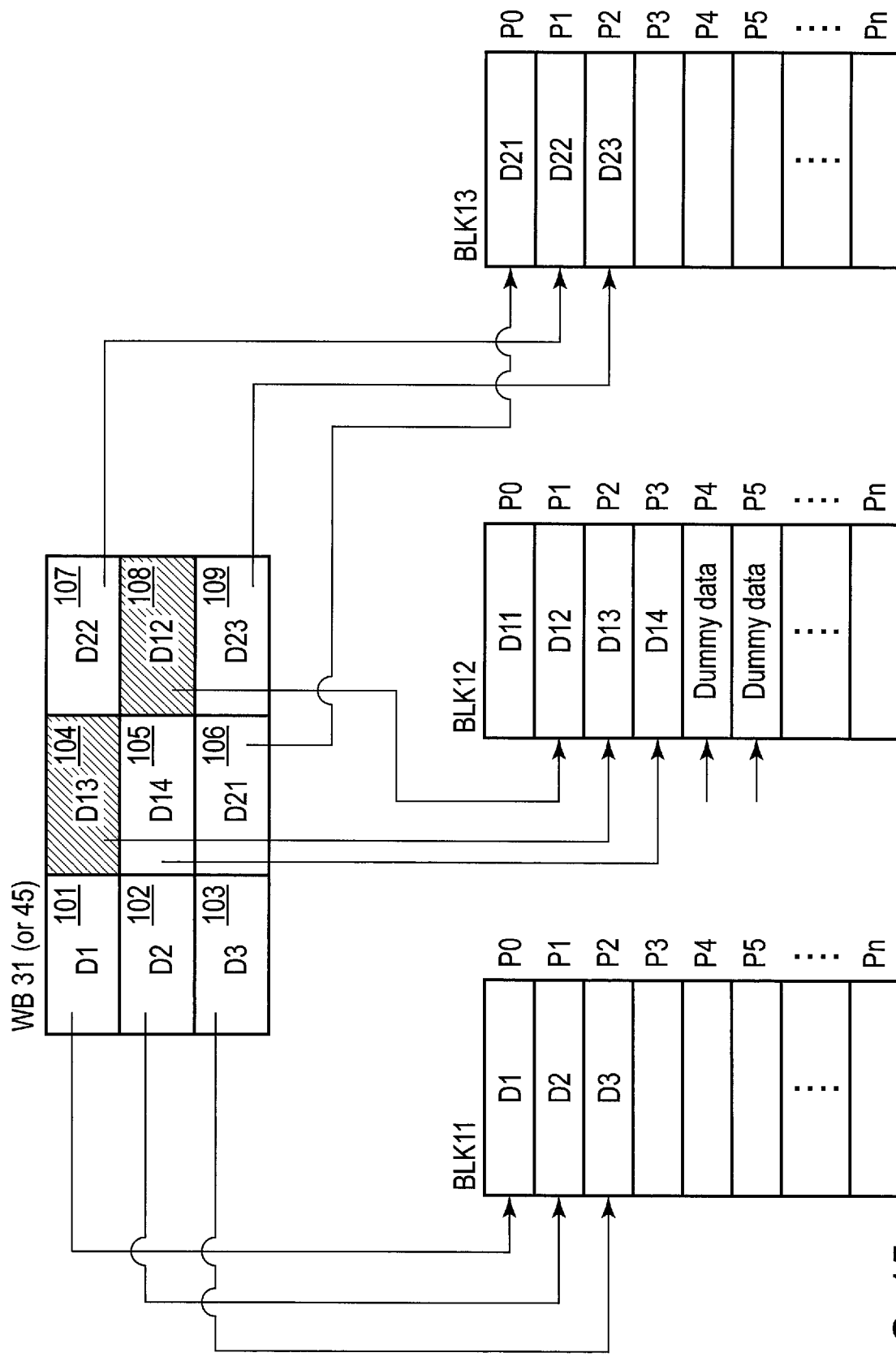
FIG. 15 is a diagram for explanation of an operation of releasing a region in the write buffer, storing data which is made readable from a certain write destination block by writing dummy data to the certain write destination block.

In this case, the controller 4 writes, for example, dummy data to one or more pages of write destination block BLK12 as shown in FIG. 15.

The data of a certain page in write destination block BLK12, which precedes page P4, is made readable by writing the dummy data to page P4 of write destination block BLK12. It is assumed here that write data D12 of page P1 of write destination block BLK12 is made readable from write destination block BLK12. In this case, the controller 4 releases the region 108 in the write buffer (WB) where write data D12 is stored.

Similarly, the data of a certain page in write destination block BLK12, which precedes page P5, is made readable by writing the dummy data to page P5 of write destination block BLK12. It is assumed here that write data D13 of page P2 of write destination block BLK12 is made readable from write destination block BLK12. In this case, the controller 4 releases the region 104 in the write buffer (WB) where write data D13 is stored.

The host 2 can store new write data to the region 108 or the region 104 in the write buffer (WB).

Next, an example of an operation of writing the data to each of the pages of the write destination block by the program operation of plural steps including the first step and the second step will be explained with reference to FIG. 16.

Figure 16:
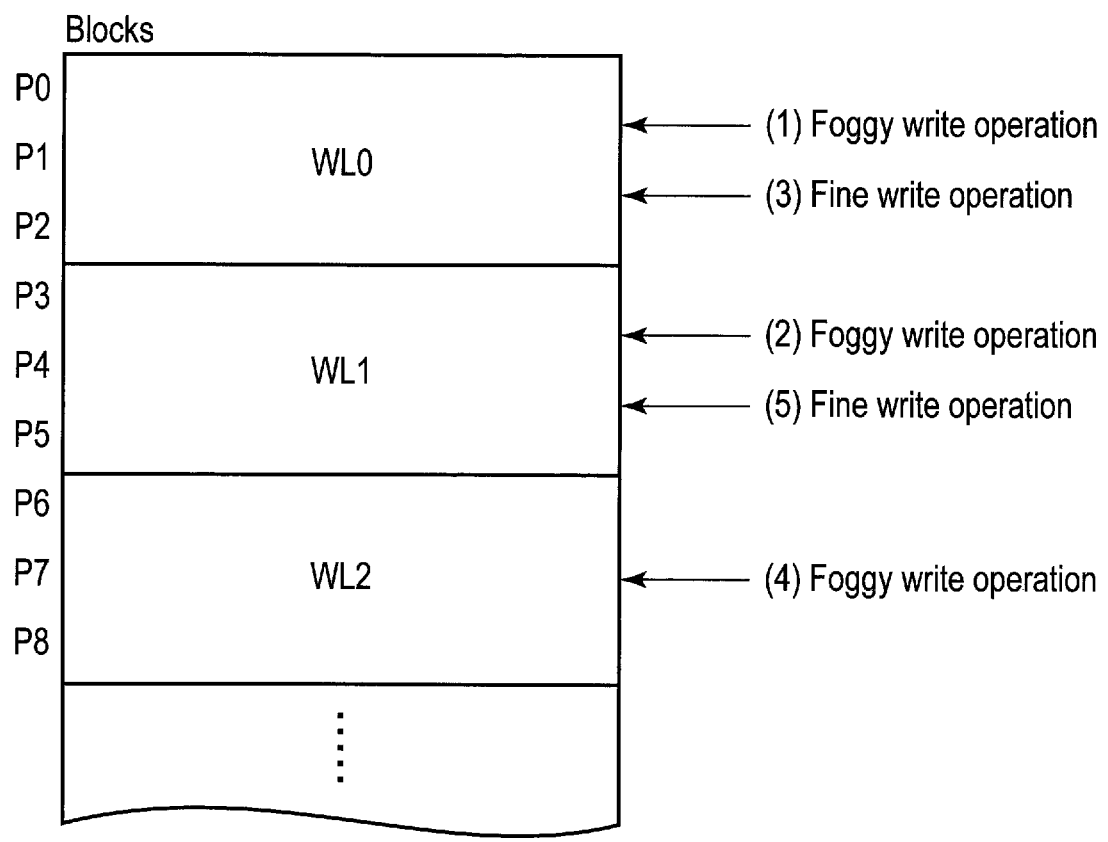
FIG. 16 is a diagram for explanation of an example of a multi-step program operation.

It is assumed in FIG. 16 that the NAND flash memory 5 is a triple-level cell (TLC)-flash memory which writes data of 3 bits per memory cell. In addition, it is also assumed in FIG. 16 that the plural-step program operation (foggy-fine program operation) is executed so as to write in two adjacent word lines back and forth.

(1) The controller 4 executes the first-step program operation (foggy program operation; often called foggy write operation) on pages P0, P1, and P2 of word line WL0. Even if the controller 4 finishes the first-step program operation (foggy program operation) on pages P0, P1, and P2, the controller 4 cannot execute the second-step program operation (fine program operation; often called fine write operation) on pages P0, P1, and P2 until the first-step program operation (foggy program operation) on pages P3, P4, and P5 of word line WL1 is executed. For this reason, the data of pages P0, P1, and P2 cannot be read when the first-step program operation (foggy program operation) on pages P0, P1, and P2 is finished.

(2), (3) When the controller 4 finishes the first-step program operation (foggy program operation) on pages P0, P1, and P2, the controller 4 executes the first-step program operation (foggy program operation) on pages P3, P4, and P5 of word line WL1. When the controller 4 finishes the first-step program operation (foggy program operation) on pages P3, P4, and P5 of word line WL1, the controller 4 can execute the second-step program operation (fine program operation) on pages P0, P1, and P2 and can thereby read the data of pages P0, P1, and P2.

(4), (5) When the controller 4 finishes the second-step program operation (fine program operation) on pages P0, P1, and P2, the controller 4 executes the first step program operation (foggy program operation) on pages P6, P7, and P8 of word line WL2. When the controller 4 finishes the first-step program operation (foggy program operation) on pages P6, P7, and P8 of word line WL2, the controller 4 can execute the second-step program operation (fine program operation) on pages P3, P4, and P5 and can thereby read the data of pages P3, P4, and P5.

Figure 17:
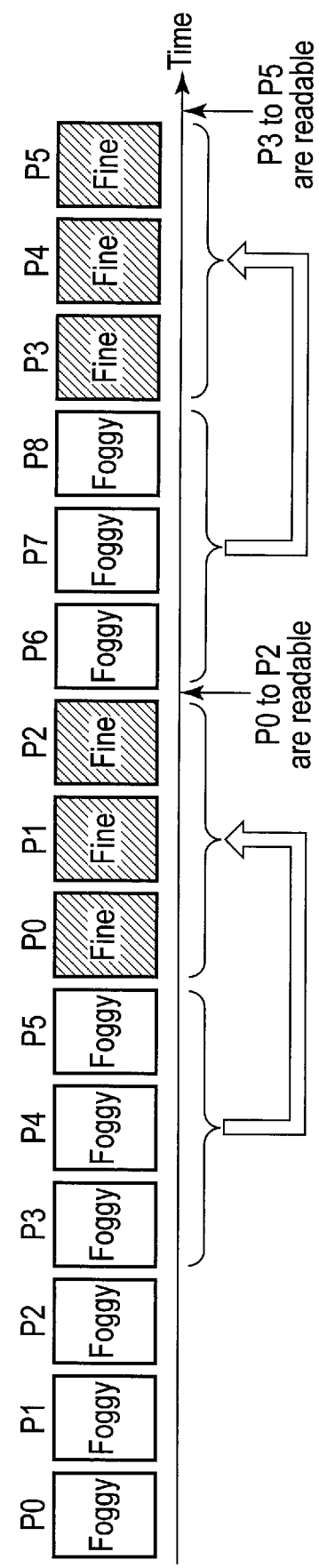
FIG. 17 is a timing chart showing the multi-step program operation (foggy-fine program operation) of FIG. 16 in time series.

The timing chart of FIG. 17 shows the program operation of FIG. 16 in time series. The controller 4 first executes the first step program operation (foggy program operation) on pages P0, P1, and P2, and then executes the first-step program operation (foggy program operation) on subsequent pages P3, P4, and P5. Since the second-step program operation (fine program operation) on preceding pages P0, P1, and P2 can be executed by the first-step program operation (foggy program operation) on subsequent pages P3, P4, and P5, the data of preceding pages P0, P1, and P2 can be read by the first-step program operation (foggy program operation) on pages P3, P4, and P5. Then, for example, if the controller 4 executes the foggy program operation on page P5, the controller 4 increases the page address where the data is to be next written by one page and sets the page as page P6.

After executing the second-step program operation (fine program operation) on preceding pages P0, P1, and P2, the controller 4 executes the first-step program operation (foggy program operation) on subsequent pages P6, P7, and P8.

Since the second-step program operation (fine program operation) on preceding pages P3, P4, and P5 can be executed by the first-step program operation (foggy program operation) on subsequent pages P6, P7, and P8, the data of preceding pages P3, P4, and P5 can be read by the first-step program operation (foggy program operation) on pages P6, P7, and P8.

In other words, if the controller 4 receives the write request including the block address from the host 2, the controller 4 acquires the write data corresponding to this write request from the write buffer, and writes this write data to the write destination page in the write destination block having the block address included in the write request by the first step program operation (foggy program operation). The controller 4 notifies the host 2 of the page address of the write destination page to which the write data has been written by sending back a response to the host 2. The controller 4 increases the page address in the write destination block to which data is to be next written, by one page. Then, the controller 4 releases a region in the write buffer, storing the data which is made readable by executing the second-step program operation (fine program operation) made executable by the first-step program operation (foggy program operation) on the write destination page. The data made readable is data of the page in the write destination block preceding the write destination page.

Figure 18:
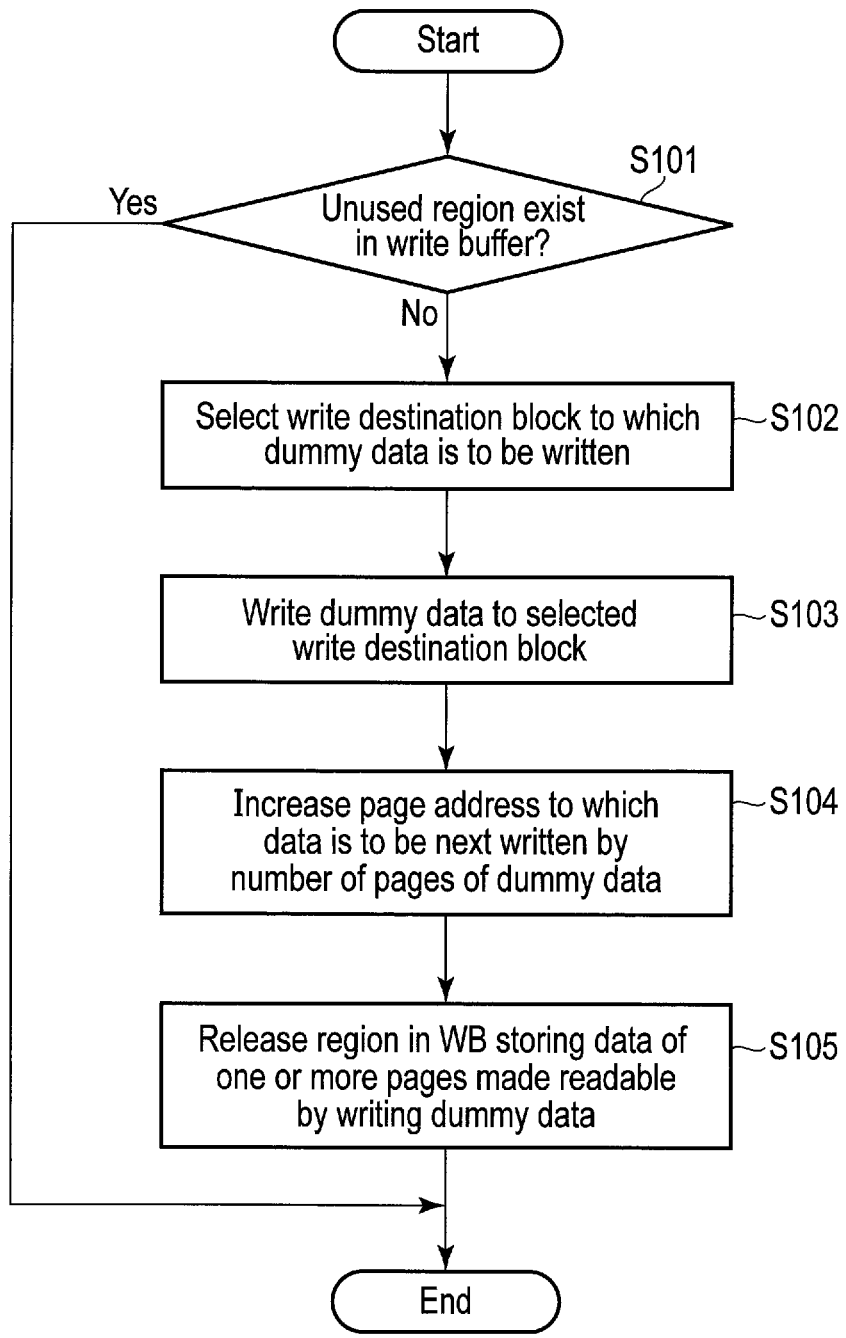
FIG. 18 is a flow chart showing a procedure of a dummy data write operation executed by the memory system according to the embodiment in a case where the write buffer includes no unused regions.

The flow chart of FIG. 18 shows a procedure of the dummy data write operation executed by the flash storage device 3 in a case where the write buffer (WB) includes no unused regions.

The controller 4 of the flash storage device 3 determines whether the write buffer (PR) includes unused regions (empty regions) or not (step S101). If all of the plural regions of the write buffer (WB) are filled with the write data of the plural write destination blocks currently opened, i.e., if the write buffer (WB) includes no unused regions (empty regions) (NO step S101), the controller 4 selects the write destination block to which the dummy data is to be written from the plural write destination blocks (step S102). For example, the controller 4 may select the write destination block holding the oldest data (i.e., data which is not updated for the longest time) from the plural write destination blocks, as the write destination block to which the dummy data is to be written. The controller 4 writes the dummy data to one or more pages in the selected write destination block (step S103), and increases the page address in the write destination block to which the data is to be next written by the number of one or more pages (i.e., the number of pages of the dummy data written) (step S104). In step S104, the page address is increased by one page if the dummy data for one page is written, and the page address is increased by two pages if the dummy data for two pages is written.

The controller 4 releases one or more regions in the write buffer (WB) storing the data of one or more pages preceding one or more pages where the dummy data is stored, which is made readable from the write destination block by writing the dummy data of one or more pages (step S104).

In a case where writing the data to each page is executed by the plural-step program operation, if the write buffer includes no unused regions, the controller 4 writes the dummy data to one or more pages in one of plural write destination blocks by the first-step program operation (foggy program operation), and increases the page address in the write destination block to which the data is to be next written, by the number of one or more pages where the dummy data is written. Then, the controller 4 releases one or more regions in the write buffer, storing the data which is made readable by executing the second-step program operation (fine program operation) made executable by the first-step program operation (foggy program operation) of the dummy data. The data made readable is data of one or more pages in the write destination block preceding the pages.

If all the data in the write destination block are made readable except the dummy data, the controller 4 stops writing the dummy data to the write destination block. For example, in FIG. 15, if the dummy data are written to plural pages of write destination block BLK12 and all of data (user data) D11, D12, D13, and D14 in write destination block BLK12 are thereby made readable except the dummy data, the controller 4 stops further writing the dummy data to the write destination block BLK12.

Figure 19:
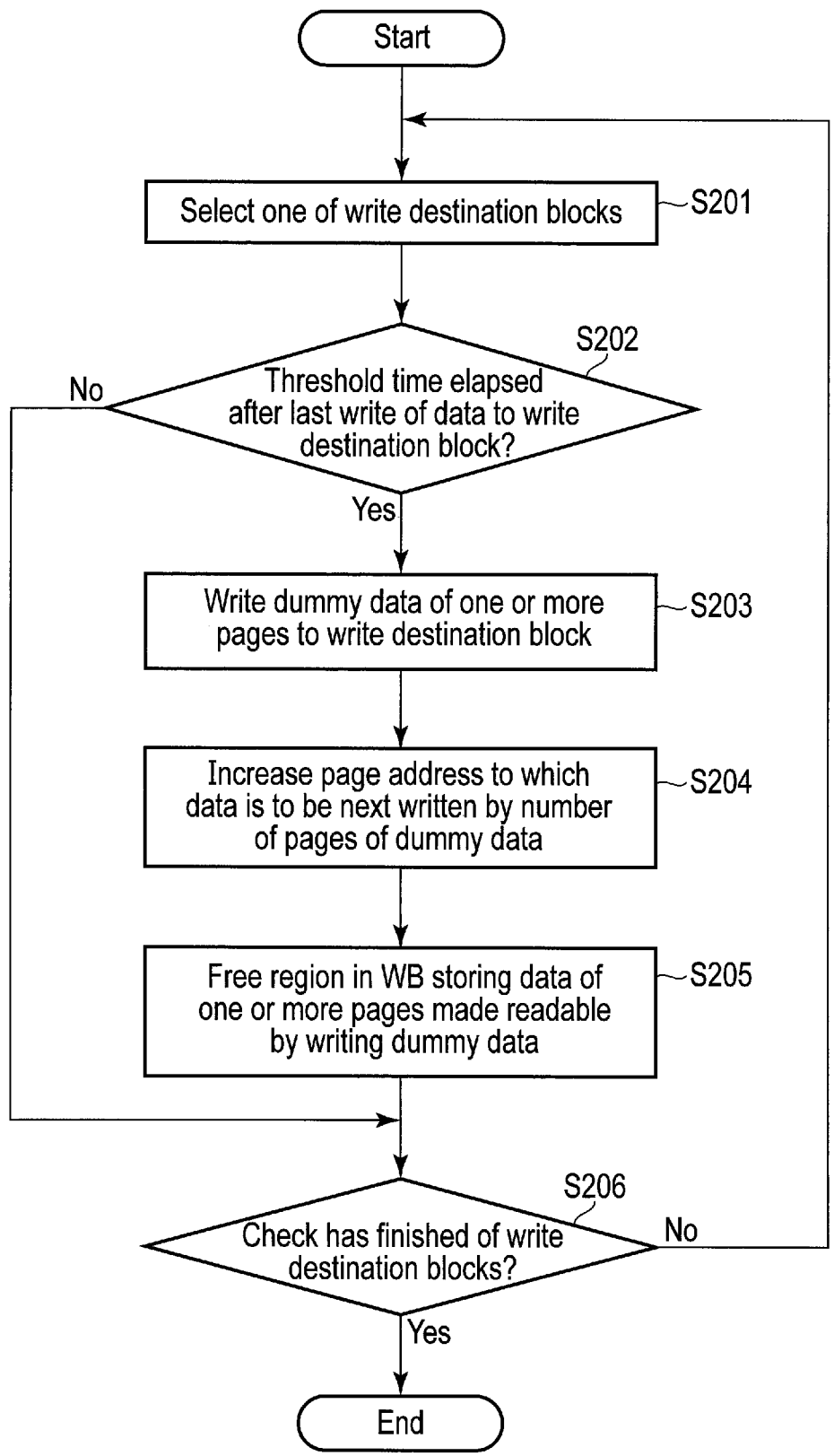
FIG. 19 is a flow chart showing a procedure of a dummy data write operation executed by the memory system according to the embodiment in a case where it is detected that writing the data of predetermined number of pages per predetermined period is not executed.

The flow chart of FIG. 19 shows a procedure of the dummy data write operation executed by the flash storage device 3 in a case where it is detected that writing the data of predetermined number of pages per predetermined period is not executed.

The controller 4 of the flash storage device 3 selects one of plural write destination blocks currently opened (step S201). The controller 4 determines whether a threshold time has elapsed or not after last write of the data (user data or dummy data) to the selected block (step S202).

If a threshold time has not elapsed after last write of the data (user data or dummy data) (NO in step S202), the controller 4 determines whether checking all the write destination blocks in step S202 has finished or not (step S206) and, if checking has not finished (NO in step S206), proceeds to step S201 and selects a next write destination block in step S201.

If the threshold time has elapsed after last write of the data (user data or dummy data) (YES in step S202), the controller 4 determines that the selected block is the block where writing the data of the predetermined number of pages per predetermined period is not executed, and writes the dummy data to one or more pages in the selected write destination block such that the entire selected block is filled with the data within a specific limited time (step S203). Then, the controller 4 increases the page address in the write destination block to which the data is to be next written by the number of one or more pages (i.e., the number of pages of the dummy data written) (step S204). In step S204, for example, the page address is increased by one page if the dummy data for one page is written to the selected block, the page address is increased by two pages if the dummy data for two pages is written to the selected block, and the page address is increased by three pages if the dummy data for three pages is written. After that, the controller 4 releases one or more regions in the write buffer, storing the data which is made readable from the selected write destination block by writing the dummy data (step S205). The data is data of one or more pages in the selected write destination block preceding one or more pages where the dummy data is stored. The controller 4 determines whether checking all the write destination blocks in step S202 has finished or not S206) and, checking has not finished (NO in step S206), proceeds to step S201 and selects a next write destination block in step S201.

In a case where writing the data to each page is executed by the plural-step program operation, if the threshold time has elapsed after last write of the data to a certain write destination block, the controller 4 writes the dummy data to one or more pages in this write destination block by the first-step program operation (foggy program operation), and increases the page address in the write destination block to which the data is to be next written, by the number of one or more pages where the dummy data is written. Then, the controller 4 releases one or more regions in the write buffer, storing the data which is made readable by executing the second-step program operation (fine program operation) made executable by the first-step program operation of the dummy data. The data made readable is data of one or more pages in the write destination block preceding the pages to which the dummy data are written.

If all the data in the write destination block are made readable except the dummy data, the controller 4 may stop writing the dummy data to the write destination block. For example, in FIG. 15, if the dummy data are written to plural pages of write destination block BLK12 and all of data (user data) D11, D12, D13, and D14 in write destination block BLK12 are thereby made readable except the dummy data, the controller 4 may stop further writing the dummy data to the write destination block.

FIG. 20 shows a configuration example of a write order management table managed by the flash storage device 3.

The controller 4 manages plural write order management tables corresponding to the plural write destination blocks. Each of the write order management tables holds plural written flags corresponding to plural pages in the write destination block corresponding to the write order management table.

Each of the plural written flags indicates whether the data is written to the page corresponding to this flag or not. The written flag corresponding to the page to which the data is written is set to a value (for example, "1") indicating that the data is written. The written flag corresponding to the page to which the data is not written is set to a value (for example, "0") indicating that the data is not written.

If the data is written to pages P0, P1, and P2 of a certain write destination block, as shown in FIG. 20, the controller 4 updates the write order management table corresponding to this write destination block, and sets each of the written flag corresponding to page P0, the written flag corresponding to page P1, and the written flag corresponding to page P2, to a value (for example, "1") indicating that the data is written.

If the controller 4 writes the dummy data to pages P3, P4, and P5 of the write destination block, the controller 4 updates the write order management table corresponding to this write destination block, and sets each of the written flag corresponding to page P3, the written flag corresponding to page P4, and the written flag corresponding to page P5, to a value (for example, "1") indicating that the data is written.

Since the dummy data is not read by the host 2, the dummy data is not stored in the write buffer. If the dummy data is written to one or more pages of the write destination block, each of one or more written flags corresponding to the pages is set to a value (for example, "1") indicating that the data is written. Therefore, even if the controller 4 writes the dummy data to either of the write destination blocks, the controller 4 can correctly manage the page write order in each of the write destination blocks by referring to each of the write order management tables.

As explained above, according to the embodiments, the controller 3 manages the plural write destination blocks, and writes data to the write destination block having the block identifier designated by the write request from the host 2. Thus, for example, control of writing the data associated with different end users to different write destination blocks can be implemented in the configuration which enables the host 2 to designate the write destination block. In addition, the controller 4 executes control of releasing the region in the write buffer, storing the data which is made readable by writing data to a certain write destination page in the certain write destination block. The data made readable is data of the page in the write destination block preceding the write destination page. Thus, in the environment in which plural write destination blocks are present, for example, buffer management of freeing the region in the write buffer, storing the write data for a certain write destination block, and using this region to store new write data for this write destination block or new write data for the other write destination block can be executed. Therefore, since the amount of the write buffer consumed per write destination block can be suppressed to a minimum, the reduction in memory resource amount consumed by the write buffer can also be attempted in the environment in which plural write destination blocks are present. Furthermore, the controller 4 also executes an operation of writing the dummy data of one or more pages to the write destination block. The available region in the write buffer can easily be thereby increased.

In addition, in the embodiments, the write buffer can be provided on the memory in the host 2. Therefore, since the controller 4 can acquire the write data from the write buffer on the memory in the host 2, the controller 4 can easily increase the number of write destination blocks simultaneously available, without preparing a large amount of write buffer in the flash storage device 3. Therefore, the number of end users sharing the flash storage device 3 can be increased without increasing the costs of the flash storage device 3.

The control of releasing the write buffer as explained in the embodiments may be applied to not only the configuration of managing the mapping between each of tags and each of physical addresses on the host 2 side, but also the configuration of managing the mapping between each of tags (for example, logical addresses such as LBA) and each of the physical addresses on the flash storage device 3 side with the logical-to-physical address translation table.

In addition, the control of releasing the write buffer as explained in the embodiments may be applied to not only the configuration of determining the write destination block on the host 2 side, but also the configuration of determining the write destination block on the flash storage device 3 side. Each of the write requests transmitted from the host 2 may not include the block address, in the configuration of determining the write destination block on the flash storage device 3 side. In addition, the controller 4 of the flash storage device 3 may determine both of the write destination block and the write destination page for each of the write requests, in the configuration of determining the write destination block on the flash storage device 3 side. Therefore, the controller 4 of the flash storage device 3 may be configured to execute the following operations.

The controller 4 acquires the first write data corresponding to the first write request received from the host 2, from the write buffer (WB) temporarily holding write data corresponding to each of the write requests. The controller 4 writes the first write data to the write destination page in the first write destination block, of the plural write destination blocks. Then, the controller 4 releases the region in the write buffer (WB) storing the data which is made readable from the first write destination block by writing the first write data to the write destination page. The data made readable is data of the page in the first write destination block preceding the write destination page. The processing of releasing this region in the write buffer (WB) may be executed when, for example, the data to be written to this page in the first write destination block preceding the write destination page is transferred from the write buffer (WB) to the NAND flash memory 5 or may be executed after executing the second-step program operation (for example, fine program operation) on this page.

In addition, in the present embodiments, the NAND flash memory has been explained as an example of a nonvolatile memory. However, the functions of the present embodiment are also applicable to, for example, various other nonvolatile memories such as a magnetoresistive random access memory MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory including a plurality of blocks, each of the plurality of blocks being a unit of a data erase operation, each of the plurality of blocks including a plurality of word lines, each of the plurality of word lines connecting a plurality of memory cells; and
a controller electrically connected to the nonvolatile memory and configured to:
in response to receiving, from the host, a first write command that includes a first identifier,
acquire first data from a write buffer,
determine, based on the first identifier, a first block from among the plurality of blocks,
write the first data to a first memory cell connected to a first word line or the first block, and
in response to detecting that a first operation is not required to be executed for a threshold time period since the first data is written to the first memory cell, the first operation being an operation to write second data to a second memory cell connected to a second word line of the first block, the second word line being different from the first word line, write dummy data to the second memory cell.

2. The memory system according to claim 1, wherein the controller is further configured to:
write data to a memory cell of the nonvolatile memory using a multi-stage programming that includes at least a first-stage programming and a second-stage programming,
write the first data to the first memory cell using the first-stage programming, and after writing the dummy data to the second memory cell using the first-stage programming, write the first data again to the first memory cell using the second-stage programming.

3. The memory system according to claim 2, wherein the controller is further configured to:
transfer the first data from the write buffer to the nonvolatile memory to write the first data to the first memory cell using the first-stage programming,
not transfer the dummy data from the write buffer, and
transfer the first data again from the write buffer to the nonvolatile memory to write the first data to the first memory cell using the second-stage programming.

4. The memory system according to claim 2, wherein
the first data is not correctly read from the first memory cell after the first data is written thereto using the first-stage programming before the first data is written again thereto using the second-stage programming, and
the first data is correctly read from the first memory cell after the first data is written thereto using the second-stage programming, wherein
the controller is further configured to:
keep the first data in a region of the write buffer, without releasing the region, after the first data is written to the first memory cell using the first-stage programming, and
after the first data is written again to the first memory cell using the second-stage programing, release the region of the write buffer.

5. The memory system according to claim 1, wherein the controller is further configured to:
in response to receiving a first control command from the host, assign the first block from the plurality of blocks for the host and notify the host of an identifier of the first block, and
write the first data to the first memory cell of the first block in response to receiving the first write command from the host that includes the first identifier.

6. The memory system according to claim 1, wherein the controller is further configured to:
assign the first block from the plurality of blocks in response to receiving a second write command from the host that does not include the first identifier.

7. The memory system according to claim 1, further comprising:
a volatile memory, wherein
the write buffer is implemented in the volatile memory.

8. The memory system according to claim 1, wherein the write buffer is implemented in a memory of the host.

9. The memory system according to claim 8, wherein the controller is further configured to:
keep the first data in a region of the write buffer, without releasing the region, after the first data is written to the first memory cell at least until the dummy data is written to the second memory cell, and
after the dummy data is written to the second memory cell, request the host to release the region of the write buffer.

10. A method of controlling a nonvolatile memory, the nonvolatile memory including a plurality of blocks, each of the plurality of blocks being a unit of a data erase operation, each of the plurality of blocks including a plurality of word lines, each of the plurality of word lines connecting a plurality of memory cells, the method comprising:
in response to receiving, from a host, a first write command that includes a first identifier,
acquiring first data from a write buffer;
determining, based on the first identifier, a first block from among the plurality of blocks;
writing the first data to a first memory cell connected to a first word line of the first block; and
in response to detecting that a first operation is not required to be executed for a threshold time period since the first data is written to the first memory cell, the first operation being an operation to write second data to a second memory cell connected to a second word line of the first block, the second word line being different from the first word line, writing dummy data to the second memory cell.

11. The method according to claim 10, wherein
data is written to a memory cell of the nonvolatile memory using a multi-stage programming that includes at least a first-stage programming and a second-stage programming,
the first data is written to the first memory cell using the first-stage programming, and
after the dummy data is written to the second memory cell using the first-stage programming, the first data is written again to the first memory cell using the second-stage programming.

12. The method according to claim 11, further comprising:
transferring the first data from the write buffer to the nonvolatile memory to write the first data to the first memory cell using the first-stage programming;
not transferring the dummy data from the write buffer; and
transferring the first data again from the write buffer to the nonvolatile memory to write the first data to the first memory cell using the second-stage programming.

13. The method according to claim 11, wherein
the first data is not correctly read from the first memory cell after the first data is written thereto using the first-stage programming before the first data is written again thereto using the second-stage programming, and
the first data is correctly read from the first memory cell after the first data is written thereto using the second-stage programming, and
the method further comprises:
keeping the first data in a region of the write buffer, without releasing the region, after the first data is written to the first memory cell using the first-stage programming; and
after the first data is written again to the first memory cell using the second-stage programming, releasing the region of the write buffer.

14. The method according to claim 10, further comprising:
in response to receiving a first control command from the host, assigning the first block from the plurality of blocks for the host and notifying the host of an identifier of the first block; and
writing the first data to the first memory cell of the first block in response to receiving the first write command from the host that includes the first identifier.

15. The method according to claim 10, further comprising:
assigning the first block from the plurality of blocks in response to receiving a second write command from the host that does not include the first identifier.

16. The method according to claim 10, wherein
the nonvolatile memory is implemented in a memory system,
the memory system further includes a volatile memory, and
the write buffer is implemented in the volatile memory.

17. The method according to claim 10, wherein the write buffer is implemented in a memory of the host.

18. The method according to claim 17, further comprising:
- keeping the first data in a region of the write buffer, without releasing the region, after the first data is written to the first memory cell at least until the dummy data is written to the second memory cell; and
- after the dummy data is written to the second memory cell, requesting the host to release the region of the write buffer.

* * * * *